(12) United States Patent
Saito et al.

(10) Patent No.: US 8,311,729 B2
(45) Date of Patent: Nov. 13, 2012

(54) TRAFFIC LANE DEVIATION PREVENTING SYSTEM FOR A VEHICLE

(75) Inventors: Toru Saito, Tokyo (JP); Shinya Kudo, Tokyo (JP); Hajime Oyama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1102 days.

(21) Appl. No.: 11/727,752

(22) Filed: Mar. 28, 2007

(65) Prior Publication Data

US 2007/0233386 A1    Oct. 4, 2007

(30) Foreign Application Priority Data

Mar. 29, 2006   (JP) ................................. 2006-090190

(51) Int. Cl.
*G05D 1/02*      (2006.01)
*G06G 7/78*      (2006.01)

(52) U.S. Cl. .......... 701/300; 701/42; 701/117; 701/122; 701/301; 701/466

(58) Field of Classification Search .................... 701/42, 701/117, 300, 122, 301, 466
See application file for complete search history.

(56) References Cited

U.S. PATENT DOCUMENTS

| | | | |
|---|---|---|---|
| 5,307,136 A | 4/1994 | Saneyoshi | |
| 5,926,126 A * | 7/1999 | Engelman | 342/70 |
| 5,938,707 A * | 8/1999 | Uehara | 701/41 |
| 6,025,797 A * | 2/2000 | Kawai et al. | 342/70 |
| 6,188,329 B1 * | 2/2001 | Glier et al. | 1/1 |
| 6,311,123 B1 * | 10/2001 | Nakamura et al. | 701/96 |
| 6,473,678 B1 | 10/2002 | Satoh et al. | |
| 6,573,929 B1 * | 6/2003 | Glier et al. | 348/149 |
| 6,691,018 B1 * | 2/2004 | Miyahara | 701/96 |
| 6,753,804 B2 * | 6/2004 | Miyahara | 342/70 |
| 6,813,370 B1 | 11/2004 | Arai | |
| 7,084,772 B2 | 8/2006 | Oyama | |
| 7,248,962 B2 * | 7/2007 | Heinrichs-Bartscher | 701/117 |
| 7,260,465 B2 * | 8/2007 | Waldis et al. | 701/96 |
| 7,302,327 B2 | 11/2007 | Kudo | |
| 7,308,432 B2 | 12/2007 | Torii et al. | |
| 7,373,237 B2 * | 5/2008 | Wagner et al. | 701/96 |
| 7,418,372 B2 * | 8/2008 | Nishira et al. | 703/2 |
| 7,532,981 B2 * | 5/2009 | Kataoka et al. | 701/300 |
| 7,539,566 B2 * | 5/2009 | Tange et al. | 701/41 |
| 7,634,341 B2 * | 12/2009 | Patchell | 701/45 |
| 7,778,759 B2 * | 8/2010 | Tange et al. | 701/96 |
| 2004/0010371 A1 * | 1/2004 | Matsumoto et al. | 701/300 |
| 2004/0148063 A1 * | 7/2004 | Patchell | 701/1 |

(Continued)

FOREIGN PATENT DOCUMENTS

JP          5-114099          5/1993

(Continued)

*Primary Examiner* — Khoi Tran
*Assistant Examiner* — Jorge Peche
(74) *Attorney, Agent, or Firm* — Smith, Gambrell & Russell, LLP

(57) ABSTRACT

A traffic lane deviation preventing system includes a traffic line detecting unit for detecting traffic line positions on a road, a control unit for determining a possibility of a vehicle's deviation from a traffic line based on the traffic line positions detected by the traffic line detecting unit and setting a travel target point to which the vehicle is to travel if it is determined that there is a possibility of a traffic line deviation. The control unit moves the travel target point toward the center of a traffic lane according to the passage of a control operation time.

23 Claims, 21 Drawing Sheets

U.S. PATENT DOCUMENTS

| | | |
|---|---|---|
| 2004/0186651 A1* | 9/2004 | Tange et al. .................... 701/96 |
| 2005/0033505 A1* | 2/2005 | Zatz ............................. 701/117 |
| 2005/0251323 A1* | 11/2005 | Heinrichs-Bartscher ..... 701/117 |
| 2005/0256630 A1* | 11/2005 | Nishira et al. ................. 701/96 |
| 2006/0149448 A1* | 7/2006 | Tange et al. .................... 701/41 |
| 2006/0184297 A1* | 8/2006 | Higgins-Luthman ........... 701/41 |
| 2006/0217887 A1* | 9/2006 | Iwasaka ....................... 701/301 |

FOREIGN PATENT DOCUMENTS

| | | |
|---|---|---|
| JP | 7-129897 | 5/1995 |
| JP | 10-283477 | 10/1998 |
| JP | 2001-039326 | 2/2001 |
| JP | 2001039326 A * | 2/2001 |
| JP | 2001-092970 | 4/2001 |
| JP | 2003-16593 | 1/2003 |
| JP | 2003016593 A * | 1/2003 |
| JP | 2004-231096 | 8/2004 |
| JP | 2004231096 A * | 8/2004 |
| JP | 2004-249812 | 9/2004 |
| JP | 2005-041308 | 2/2005 |
| JP | 2005-071185 | 3/2005 |

* cited by examiner

US 8,311,729 B2

TRAFFIC LANE DEVIATION PREVENTING SYSTEM FOR A VEHICLE

CROSS REFERENCE TO RELATED APPLICATIONS

The disclosure of Japanese Application No. 2006-090190 filed on Mar. 29, 2006 including the specification, drawings, and abstract is incorporated herein by reference in its entirety.

BACKGROUND OF THE INVENTION

1. Field of the Invention

The present invention relates to traffic lane deviation preventing systems, and more particularly to a traffic lane deviation preventing system that determines a possibility of its vehicle's deviation from a traffic lane and automatically carries out deviation preventing control.

2. Description of the Related Art

In recent years, traffic lane deviation preventing techniques have been developed. According to such techniques, in order to prevent a vehicle from deviating from either the right or left traffic line of the traffic lane that the vehicle takes and crossing over or entering the adjacent lane, a region ahead of the vehicle is image-sensed using a CCD (Charge Coupled Device) camera or the like to detect the traffic lane and a possibility of traffic lane deviation is determined (see for example JP-A-2003-16593).

Various kinds of traffic lane deviation preventing systems that have been suggested automatically have a vehicle returned to the lane the vehicle should take at the present by activating self steering control when a possibility of traffic lane deviation is determined (see for example JP-A-7-129897, JP-A-2001-39326 (e.g., see also, U.S. Pat. No. 6,473,678), and JP-A-2004-231096).

According to conventional traffic lane deviation preventing techniques, a travel target point is set a prescribed distance ahead of the vehicle on a line extending in the vertical direction to a traffic line, and the vehicle moves toward the travel target point by self steering control, so that the vehicle is returned to the present traffic lane.

According to the traffic lane deviation preventing technique, the travel target point is often set in the center of the traffic lane, in other words, at a point equidistant from the right and left traffic lines. If the self steering control is carried out to make the vehicle follow the travel target point set in this manner, however, the steering wheel is abruptly turned in the opposite direction upon determination of deviation as shown in FIG. 20, and the yaw rate and steering wheel torque of the vehicle significantly change.

Therefore, the driver feels awkward as if the vehicle is forcibly pulled back and changed in the position. After the vehicle is pulled back, the vehicle can meander between the right and left with respect to the center of the traffic lane by overshoot.

Furthermore, according to some conventional traffic lane deviation preventing techniques, a vehicle on the verge of deviating from a traffic line has its advancing direction returned simply horizontally to the traffic line or changed in an averting direction or force is gradually provided to move the vehicle in the averting direction so that the time before the deviation is simply prolonged. According to the methods, however, the vehicle is allowed to move simply near the line from which the vehicle is likely to deviate as shown in FIG. 21 and lane deviation cannot sufficiently be prevented.

SUMMARY OF THE INVENTION

The present invention is directed to a solution to the disadvantages and it is an object of the invention to provide a traffic lane deviation preventing system that can surely prevent a vehicle from deviating from a traffic line without giving the driver the awkward feeling as if the vehicle is forcibly pulled back in traffic lane deviation preventing control of the vehicle.

In order to solve the above-described disadvantages, a traffic lane deviation preventing system for a vehicle according to a first aspect of the invention includes traffic line detecting means for detecting the position of a traffic line on a road, control means for determining a possibility of its vehicle's deviation from the traffic line based on the position of the traffic line detected by the traffic line detecting means, and, if deviation from the traffic line is possible, carrying out deviation preventing control by setting a travel target point to which the vehicle should travel and transmitting a signal to a responsive unit so that the vehicle travels to the travel target point, and count means for counting the passage of control operation time of the deviation preventing control, and the control means controls the travel target point to move in a direction toward the center of a traffic lane in which the vehicle travels as the control operation time counted by the count means passes.

According to a second aspect of the invention, in the traffic lane deviation preventing system for a vehicle according to the first aspect, if the traffic line position is no longer detected by the traffic line detecting means after the start of control operation by the deviation preventing control, the control means continues to move the travel target point based on the previously detected position of the traffic line and continues the control operation by the deviation preventing control.

According to a third aspect of the invention, in the traffic lane deviation preventing system for a vehicle according to the first aspect, the control means sets the travel target point set for the first time to a position a prescribed distance ahead of the vehicle and a distance equal to a half of the vehicle width apart from the traffic line from which the vehicle is likely to deviate.

According to a fourth aspect of the invention, in the traffic lane deviation preventing system for a vehicle according to the first aspect, the control means sets the travel target point set for the first time to a position a prescribed distance ahead of the vehicle and apart from the traffic line by the present distance between the vehicle and the traffic line from which the vehicle is likely to deviate.

According to a fifth aspect of the invention, in the traffic lane deviation preventing system for a vehicle according to the first aspect, the control means sets the travel target point set for the first time to a position a prescribed distance ahead of the vehicle where a change at most equal to a prescribed threshold is generated in at least one of the yaw rate, the steering wheel torque, and the steering wheel angle of the steering wheel of the vehicle.

According to a sixth aspect of the invention, in the traffic lane deviation preventing system for a vehicle according to the first aspect, the control means sets the travel target point set for the first time to a position a prescribed distance ahead of the vehicle where a change larger than a prescribed threshold is generated in at least one of the yaw rate, the steering wheel torque, and the steering wheel angle of the steering wheel of the vehicle.

According to a seventh aspect of the invention, in the traffic lane deviation preventing system for a vehicle according to the first aspect, the control means moves the travel target point in the direction toward the center of the traffic lane by a prescribed distance per unit time.

According to an eighth aspect of the invention, in the traffic lane deviation preventing system for a vehicle according to the first aspect, the control means moves the travel target point so that the position of the travel target point at the end of the control operation by the deviation preventing control is in the center of a traffic lane calculated from the positions of traffic lines on the right and left of the vehicle detected by the traffic line detecting means.

According to a ninth aspect of the invention, in the traffic lane deviation preventing system for a vehicle according to the first aspect, the control means moves the travel target point so that the travel target point at the end of the control operation by the deviation preventing control is apart by a distance equal to a half of the vehicle width from a traffic line from which the vehicle is likely to deviate.

According to a tenth aspect of the invention, in the traffic lane deviation preventing system for a vehicle according to the first aspect, if the travel target point reaches a prescribed position before the control operation time counted by the count means reaches predetermined time, the control means ends the control operation by the deviation preventing control.

According to an eleventh aspect of the invention, in the traffic lane deviation preventing system for a vehicle according to the tenth aspect, the prescribed position is in the center of a traffic lane calculated from the positions of traffic lines on the right and left of the vehicle detected by the traffic line detecting means.

According to a twelfth aspect of the invention, in the traffic lane deviation preventing system for a vehicle according to the first aspect, the control means ends the control operation by the deviation preventing control in response to input of a turn signal.

According to a thirteenth aspect of the invention, in the traffic lane deviation preventing system for a vehicle according to the first aspect, the control means ends the control operation by the deviation preventing control when an end of the vehicle deviating from a traffic line protrudes from the traffic line at least by a prescribed distance on the outer side of the traffic line.

According to a fourteenth aspect of the invention, in the traffic lane deviation preventing system for a vehicle according to the twelfth or thirteenth aspect, after the end of the control operation, the control means does not start control operation by the deviation preventing control when the vehicle moves away from the traffic line or continues to move across the traffic line.

According to a fifteenth aspect of the invention, in the traffic lane deviation preventing system for a vehicle according to the first aspect, the control means ends the control operation by the deviation preventing control when the steering of the steering wheel by the driver of the vehicle is detected.

According to a sixteenth aspect of the invention, in the traffic lane deviation preventing system for a vehicle according to the fifteenth aspect, the steering of the steering wheel by the driver is detected at least any of when a steering wheel torque exceeding a prescribed threshold is input from the steering torque sensor, when a steering wheel torque continues to be input for a period exceeding prescribed duration, and when a differential value of the steering wheel angle of the steering wheel input from the steering wheel angle sensor exceeds a prescribed threshold.

According to a seventeenth aspect of the invention, in the traffic lane deviation preventing system for a vehicle according to the first aspect further includes solid object detecting means for detecting a solid object in an image produced by image-sensing a path ahead of the running vehicle including a road, when a solid object is detected by the solid object detecting means on the side of a traffic line from which the vehicle is likely to deviate, and the control means shortens the control operation time set at the count means and increases the moving distance of the travel target point per unit time.

According to an eighteenth aspect of the invention, the traffic lane deviation preventing system for a vehicle according to the first aspect further includes solid object detecting means for detecting a solid object in an image produced by image-sensing a path ahead of the running vehicle including a road, if the solid object is detected by the solid object detecting means on a traffic line on the opposite side to the traffic line from which the vehicle is likely to deviate, and the control means stops the movement of the travel target point in a location a prescribed distance apart from the solid object or ends the control operation by the deviation preventing control.

According to a nineteenth aspect of the invention in the traffic lane deviation preventing system for a vehicle according to the first aspect, the control means makes an indication at a display connected thereto or outputs an audio sound for notifying that the deviation preventing control is active.

According to a twentieth aspect of the invention, in the traffic lane deviation preventing system for a vehicle according to the first aspect, if the traffic line from which the vehicle is likely to deviate is indicated as a continuous line, the control means sets control operation time shorter than control operation time by deviation preventing control set for a traffic line indicated as a broken line.

According to a twenty-first aspect of the invention, the traffic lane deviation preventing system for a vehicle according to the first aspect further includes wakefulness estimating means for estimating the wakefulness of the driver, and the control means shortens the control operation time set at the count means and increases the moving distance of the travel target point per unit time if it is determined that the wakefulness of the driver is low based on an estimation result by the wakefulness estimating means.

According to the first aspect of the invention, the travel target point set for the first time when it is determined that there is a possibility of the vehicle's deviation from a traffic line is not set in the center of the traffic lane the vehicle drives in like the conventional traffic lane deviation preventing system but is set nearer to the traffic line. Therefore, as can be understood from the comparison between FIG. 20 and FIG. 18 that will be described, according to the embodiment, the steering wheel is gradually turned and the yaw rate and the steeling wheel torque of the vehicle gradually change, so that the lane deviation can be prevented without giving the driver any awkward feeling as if the driver is forcibly pulled back in the vehicle position.

Since the travel target point is moved toward the center of the traffic lane as the control operation time passes, the vehicle can smoothly be pulled back to the central side of the traffic lane without causing the vehicle to meander between the right and left with respect to the center of the traffic lane by overshoot as is the case with the conventional traffic lane deviation preventing system shown in FIG. 20.

Furthermore, the travel target point is moved away from a traffic line from which the vehicle is likely to deviate, so that the vehicle can be pulled back to the central side of the traffic lane without staying near the line like the conventional traffic line deviation preventing system as shown in FIG. 21, so that the lane deviation can surely be prevented and the vehicle can be prevented from contacting a vehicle that drives in the adjacent lane.

According to the second aspect of the invention, even if the traffic line position is not detected after the control operation of the deviation preventing control is started, the movement of the travel target point is continued based on a virtual traffic line position and the control operation of the deviation preventing control can be continued. Therefore, the advantages of the invention can continue to be stably provided.

According to the third aspect of the invention, the travel target point set for the first time is not set in the center of the traffic lane the vehicle drives in but is set nearer to a traffic line from which the vehicle is likely to deviate. Therefore, the advantages of the above-described aspects of the invention can surely be provided. If the travel target point is not moved toward the center of the traffic lane for some reasons, an end of the vehicle is pulled back to coincide with the position of the traffic line from which the vehicle could otherwise deviate at the end of the control operation, so that at least contact or collision with a vehicle that drives in the adjacent traffic lane can be prevented.

According to the fourth aspect of the invention, the target travel point set for the first time is not set in the center of the traffic lane but is set nearer to the side of a traffic line from which the vehicle is likely to deviate, and therefore the advantages of the above-described aspects of the invention can surely be provided.

According to the fifth aspect of the invention, once the control operation by the deviation preventing control is started, the yaw rate, the steering wheel torque, and the steering wheel angle of the steering wheel of the vehicle change and the driver may feel as if the vehicle has its attitude abruptly changed. Therefore, a threshold for a change in the yaw rate or the like is previously obtained, the travel target point set for the first time may be set in such a position that a change is kept equal to or smaller than the threshold and the driver can be prevented from feeling such abruptness in addition to the advantages of the above-described aspects of the invention.

According to the sixth aspect of the invention, when the vehicle is to deviate from a traffic line because of the driver's drowsy driving, inattentiveness in the advancing direction or the like, the driver may be awakened and warned in addition to the advantages of the above-described aspects of the invention by setting the travel target point set for the first is set so that a change in the yaw rate or the like larger than a previously obtained threshold is generated.

According to the seventh aspect of the invention, since the travel target point moves toward the center of the traffic lane at a fixed moving speed, the vehicle can be pulled back to the central side of the traffic lane more smoothly, so that the advantages of the above-described aspects of the invention can more surely be provided. In addition, a new moving speed can easily be produced when the control operation by the deviation preventing control must be ended after duration shorter than the set control operation time.

According to the eighth aspect of the invention, the traffic target point is positioned in the center of the traffic lane at the end of the control operation by the deviation preventing control, and therefore in addition to the advantages of the above-described aspects of the invention, the vehicle can surely be pulled back to the traffic lane.

According to the ninth aspect of the invention, at the end of the control operation the travel target point is moved to a position apart from a traffic line by a distance equal to a half of the vehicle width. Therefore, in addition to the advantages of the above-described aspects of the invention, the vehicle can effectively be pulled back to the traffic lane and at least contact or collision with a vehicle that drives in the adjacent traffic lane can be prevented.

According to the tenth aspect of the invention, the calculation load for the deviation preventing control is alleviated and the meandering caused by overshoot can be prevented, so that the advantages of the above-described aspects of the invention can effectively be provided.

According to the eleventh aspect of the invention, the control operation by the deviation preventing control ends if the travel target point reaches the center of the traffic lane before the control operation time reaches previously set time, and therefore in addition to the advantage of the tenth aspect of the invention, the vehicle can surely be pulled back to the traffic lane.

According to the twelfth aspect of the invention, in addition to the advantages of the above-described aspects of the invention, if turn signal operation is carried out by the driver, it is determined that the driver intends to make a lane change and the control operation by the deviation preventing control ends, so that the driver can make a smooth lane change without being affected.

According to the thirteenth aspect of the invention, in addition to the advantages of the above-described aspects of the invention, if an end of the vehicle deviating from a traffic line protrudes from the traffic line at least by a prescribed distance on the outer side of the traffic line, it is determined that the driver intends to make a lane change, so that the control operation by the deviation preventing control ends and the driver can make a smooth lane change without being affected.

According to the fourteenth aspect of the invention, if the deviation preventing control is carried out in a traffic lane on the side the vehicle is to enter while there is no lane deviation, excess steering wheel torque can be applied in the steering of the steering wheel, which can make the wheel steering unstable. However, in addition to the advantages of the above-described aspects of the invention, the control operation by the deviation preventing control is not started when the vehicle moves away from the traffic line or continues to move across the traffic line after the end of the control operation according to the fourteenth aspect of the invention. In this way, excess steering wheel torque is not applied in the steering of the steering wheel, and the driver can smoothly carry out the steering.

According to the fifteenth aspect of the invention, in addition to the advantages of the above-described aspects of the invention, if it is determined that the driver intends to steer the steering wheel, it can be assumed that the driver himself/herself is aware of the deviation from a traffic line, and takes a preventing action or intends to make a lane change in this case, and therefore the control operation by the deviation preventing control ends, so that the driver can make a smooth lane change.

According to the sixteenth aspect of the invention, if a steering wheel torque larger than a prescribed threshold is input from the steering wheel torque sensor or a steering wheel torque continues to be input for a period exceeding prescribed duration, or if a differential value of the steering wheel angle of the steering wheel input from the steering wheel angle sensor exceeds a prescribed threshold, it is determined that the driver himself/herself intends to prevent lane deviation or intends to make a lane change, so that the driver's intention can be known more surely and the advantage of the fifteenth aspect of the invention can more surely be provided.

According to the seventeenth aspect of the invention, in addition to the advantages of the above-described aspects of the invention, if the solid object detecting means detects a solid object on the side of a traffic line from which the vehicle is likely to deviate, the control operation time set at the count means is shortened and the moving distance of the travel target point per unit time is increased, so that the vehicle can quickly be pulled back to the traffic lane and its collision against the solid object can surely be prevented.

According to the eighteenth aspect of the invention, in addition to the advantages of the above-described aspects of the invention, if the solid object detecting means detects a solid object such as a vehicle parked on the road on the line opposite to the line from which the vehicle is likely to deviate, the movement of the travel target point is stopped a position where the vehicle is for example one meter apart from the solid object, so that the vehicle can pass by the object while the vehicle is one meter apart from the solid object, and its collision against the solid object can be prevented. In addition, its collision against an abruptly opened door of the parked vehicle can be prevented.

The position of the traffic target point set for the first time when it is determined that there is a possibility of the vehicle's deviation from a traffic line is already within a prescribed distance such as one meter from an obstacle, the control operation by the deviation preventing control ends, so that the driver can smoothly avoid the solid object ahead of the vehicle by making necessary judgement.

According to the nineteenth aspect of the invention, in addition to the advantages of the above-described aspects of the invention, an indication is made for notifying that the deviation preventing control is active so that the driver can be warned and encouraged to take an appropriate action.

According to the twentieth aspect of the invention, if a traffic line from which the vehicle is likely to deviate is a continuous line, the control operation time shorter than that by the deviation preventing control if the traffic line is a broken line is set, so that, in addition to the advantages of the above-described aspects of the invention, the vehicle can more quickly be pulled back to the traffic lane for a continuous line that is more strictly prohibited from being crossed over than a broken line.

According to the twenty-first aspect of the invention, in addition to the advantages of the above-described aspects of the invention, if it is determined that the wakefulness of the driver is low based on an estimation result by the wakefulness estimating means, the control operation time set at the count means is shortened and the moving distance of the travel target point per unit time is increased. In this way, the driver can surely be awakened and warned, so that the driver can take an appropriate action.

BRIEF DESCRIPTION OF THE DRAWINGS

FIG. 15 is a view for use in illustrating a case in which an obstacle is detected in a lane for example by on-road parking or the like;

DETAILED DESCRIPTION OF THE PREFERRED EMBODIMENTS

Now, a traffic lane deviation preventing system according to an embodiment of the invention will be described in conjunction with the accompanying drawings.

Figure 1:
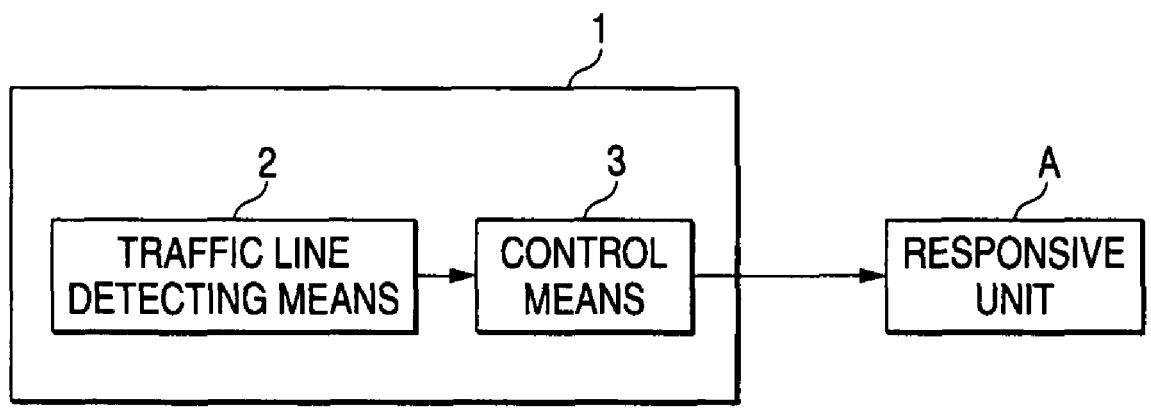
FIG. 1 is a block diagram of the configuration of a traffic lane deviation preventing system according to an embodiment of the invention.

As shown in FIG. 1, the traffic lane deviation preventing system 1 according to the embodiment includes traffic line detecting means 2 and control means 3. The control means 3 is connected with a responsive unit A including a control system that has a steering servo function, and the control means 3 transmits a signal to the responsive unit A so that deviation preventing control is carried out.

According to the embodiment, the detecting means 26 of the traffic line detecting means 2 and the control means 3 are implemented by a microcomputer having a CPU, a ROM, a RAM, and an input/output interface (not shown) connected to a bus.

The traffic line detecting means 2 may be any means capable of detecting a traffic line based on an image produced by image-sensing a path ahead of its vehicle including a road, and the method of detecting a traffic line is not limited to a specific method. According to the embodiment, the traffic line detecting means 2 is based on a lane recognizing device disclosed by JP-A-2001-92970 (e.g., see also, U.S. Pat. No. 6,813,370), which will briefly be described, while details of the structure are found in the document.

Note that according to the invention, the term "traffic line" refers to a continuous line or a broken line indicated on the surface of a road including a road halfway line such as a no-overtaking line, a boundary line of a vehicle passing zone, and a section line that separates a roadside zone and a road. The traffic lane refers to a vehicle passing zone between traffic lines in which a vehicle travels.

Figure 2:
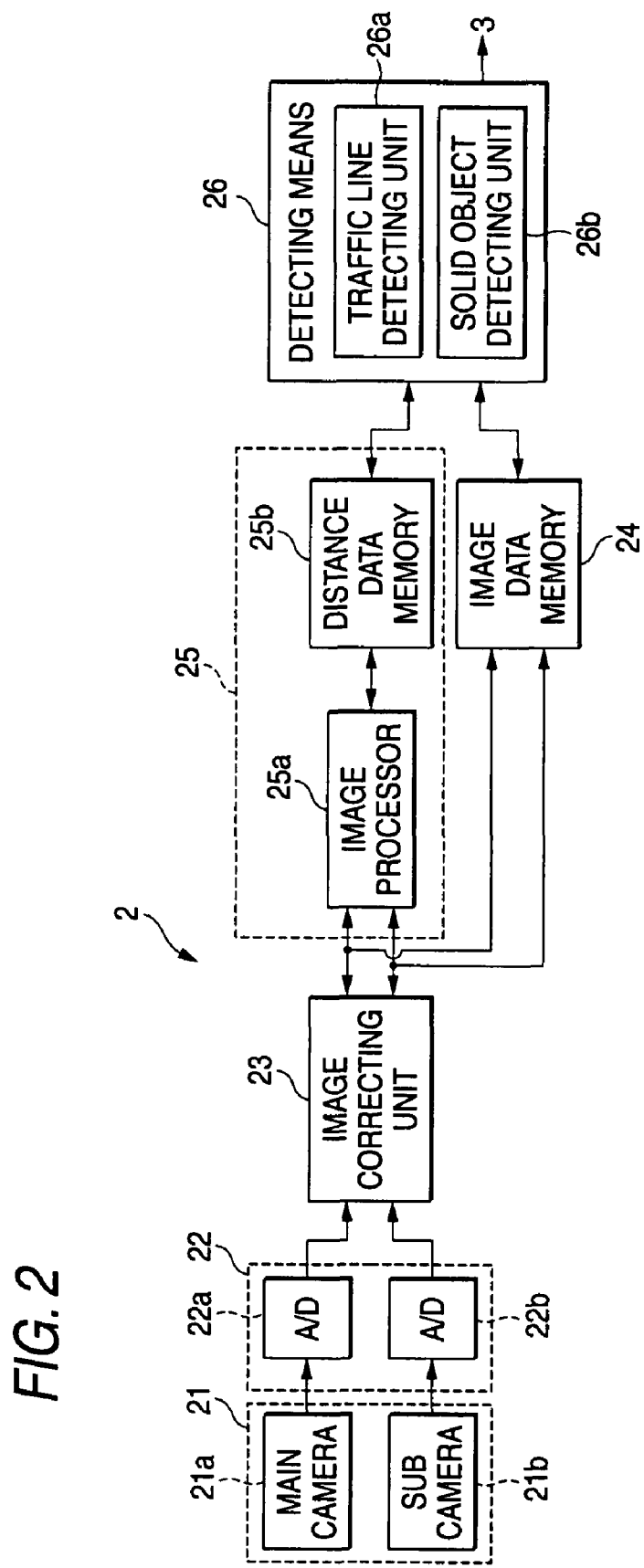
FIG. 2 is a block diagram of the configuration of traffic line detecting means according to the embodiment.

As shown in FIG. 2, the traffic line detecting means 2 mainly includes image-sensing means 21, conversion means 22, image processing means 25, and the detecting means 26.

Figure 3:
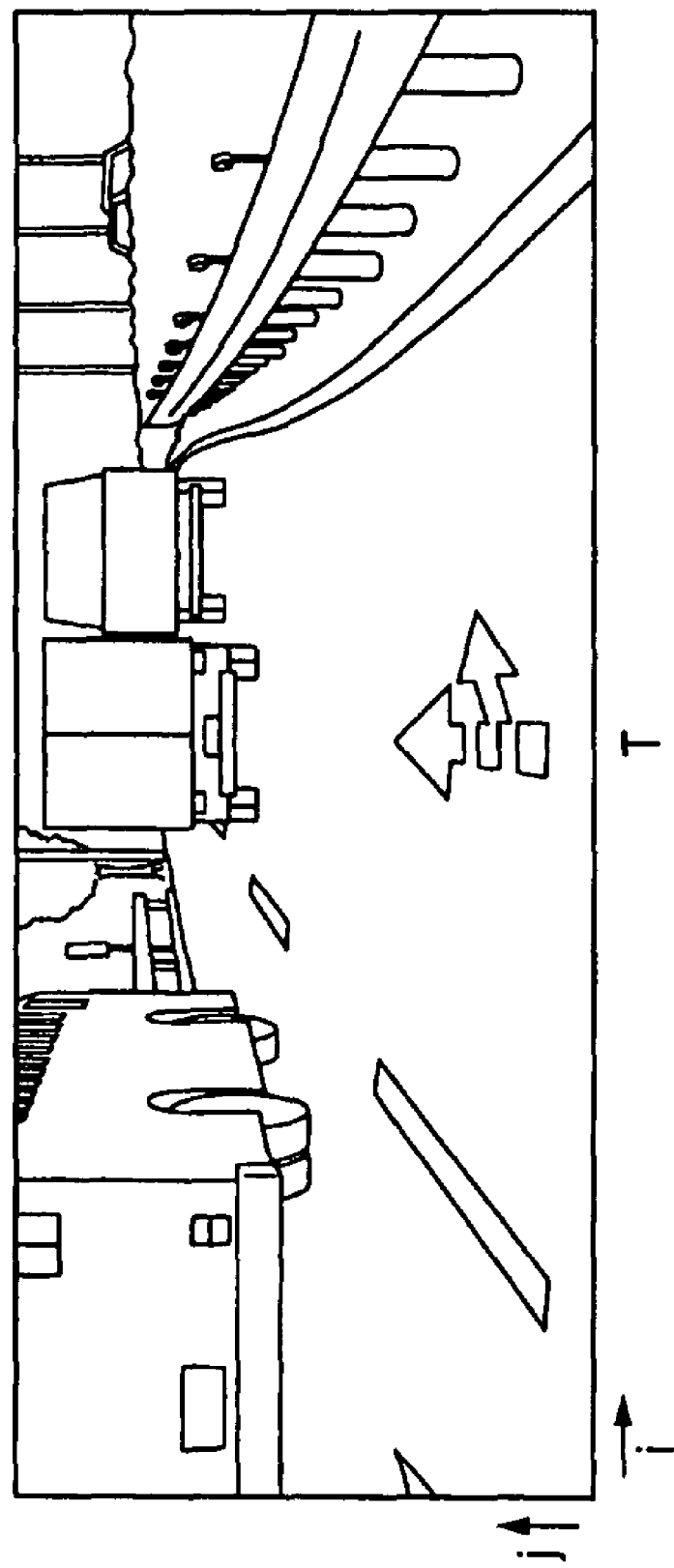
FIG. 3 is a view of an example of a reference image.

The image-sensing means 21 is a stereo camera that image-senses a path ahead of the vehicle including a road and outputs a pair of images. According to the embodiment, a main camera 21a and a sub camera 21b are CCD cameras. The main camera 21a and the sub camera 21b are attached a prescribed distance apart from each other in the width-wise direction of the vehicle in a position such as at an interior rearview mirror. The camera nearer to the driver is the main camera 21a that takes a reference image T as shown in FIG. 3, and the camera further from the driver is the sub camera 21b that takes a comparison image (not shown).

A pair of analog images output from the main camera 21a and the sub camera 21b is converted into digital images having a luminance value in the 256 gray scale for each pixel by A/D converters 22a and 22b serving as the conversion means 22 and the images are output to an image correcting unit 23. At the image correcting unit 23, the reference image T and the comparison image are subjected to image correction such as luminance value correction including removal of a deviation and a noise caused by an error in the attachment positions of the main camera 21a and the sub camera 21b. The reference image T and the comparison image are stored in an image data memory 24 and transmitted to the image processing means 25 at the same time.

In an image processor 25a in the image processing means 25, a parallax dp used for calculating the distance in a real space for each set region made of each pixel or a block including a plurality of pixels of the reference image T is calculated based on the digital data of the reference image T and the comparison image output from the image correcting unit 23 by stereo matching processing and filtering processing. The calculation of the parallax dp is described in detail in JP-A-5-114099 (e.g., see also, U.S. Pat. No. 5,307,136) filed by the applicant prior to the filing of the present application. Now, its main feature will briefly be described.

The image processor 25a calculates one parallax dp based on the luminance characteristic of 16 pixels for each of the pixel blocks consisting of 4×4 pixels as for the reference image T. More specifically, the comparison image is divided into horizontal lines each having a width of four pixels and extending in the horizontal direction, and one pixel block of the reference image T is extracted and shifted on the horizontal line of the comparison image corresponding thereto in the horizontal direction or the i-direction on a one-pixel-basis, so that the pixel block on the horizontal line having the minimum city block distance CB obtained by the following expression (1) in other words a pixel block on the comparison image having a luminance value characteristic similar to the pixel block of the reference image T is searched for.

$$CB = \Sigma |p1ij - p2ij| \qquad (1)$$

where $p1ij$ represents the luminance value of a pixel at coordinates (i, j) on the reference image T and $p2ij$ represents the luminance value of a pixel at the same coordinates on the comparison image. The coordinates represent the i and j coordinates of the pixel at the lower left corner of a pixel block when the origin is located at the lower left corner of the image plane of the reference image T, the horizontal direction is referred to as i-coordinate axis, and the vertical direction is referred to as j-coordinate axis. As for the comparison image, the i-coordinate and the j-coordinate are similarly arranged with respect to the pixel previously associated to the origin of the reference image T as the origin.

The image process 25a calculates the amount of displacement between a pixel block on the comparison image specified in this way and the original pixel block on the reference image T, and the displacement amount is allocated to the image block on the reference image T as the parallax dp.

The parallax dp represents a relative displacement amount in the horizontal direction related to the photographing positions of the same object in the reference image T and the comparison image derived from the prescribed distance between the main camera 21a and the sub camera 21b and the distances L from the central positions of the main camera 21a and the sub camera 21b to the object and the parallax dp can uniquely be associated based on the principle of triangulation.

The distance L based on the parallax dp of each pixel block in the reference image T calculated by the image processor 25a is stored in the distance data memory 25b of the image processing means 25. In the following processing in the detecting means 26, 16 pixels that originally form one image block are processed as independent pixels, and the pixels are processed as each having information for the distance L. An image formed by allocating a distance Lij to each of the pixels (i, j) stored in the distance data memory 25b is called a distance image. Note that in the following processing in the detecting means 26, a pixel block may be treated as a whole rather than 16 independent pixels.

The detecting means 26 includes a traffic line detecting unit 26a and a solid object detecting unit 26b according to the embodiment.

The traffic line detecting unit 26a reads out information about the luminance value $p1ij$ of each of the pixels of the reference image T from the image data memory 24 and information about the distance Lij of each of the pixels in the distance image from the distance data memory 25b and detects a traffic line on the image based on these kinds of information.

More specifically, the traffic line detecting unit 26a searches on a horizontal line having a width of one pixel on the reference image T by offsetting on a one-pixel basis and detects a pixel that satisfies a condition such as a change equal to or larger than a threshold in the luminance differential value of each pixel or the edge intensity based on the luminance value $p1ij$ of each of the pixels of the reference image T. At the time, if a pixel detected based on the information about the distance Lij of each of the pixels allocated to the distance image corresponding to the reference image T is not on the road surface, the pixel is excluded.

Figure 4:
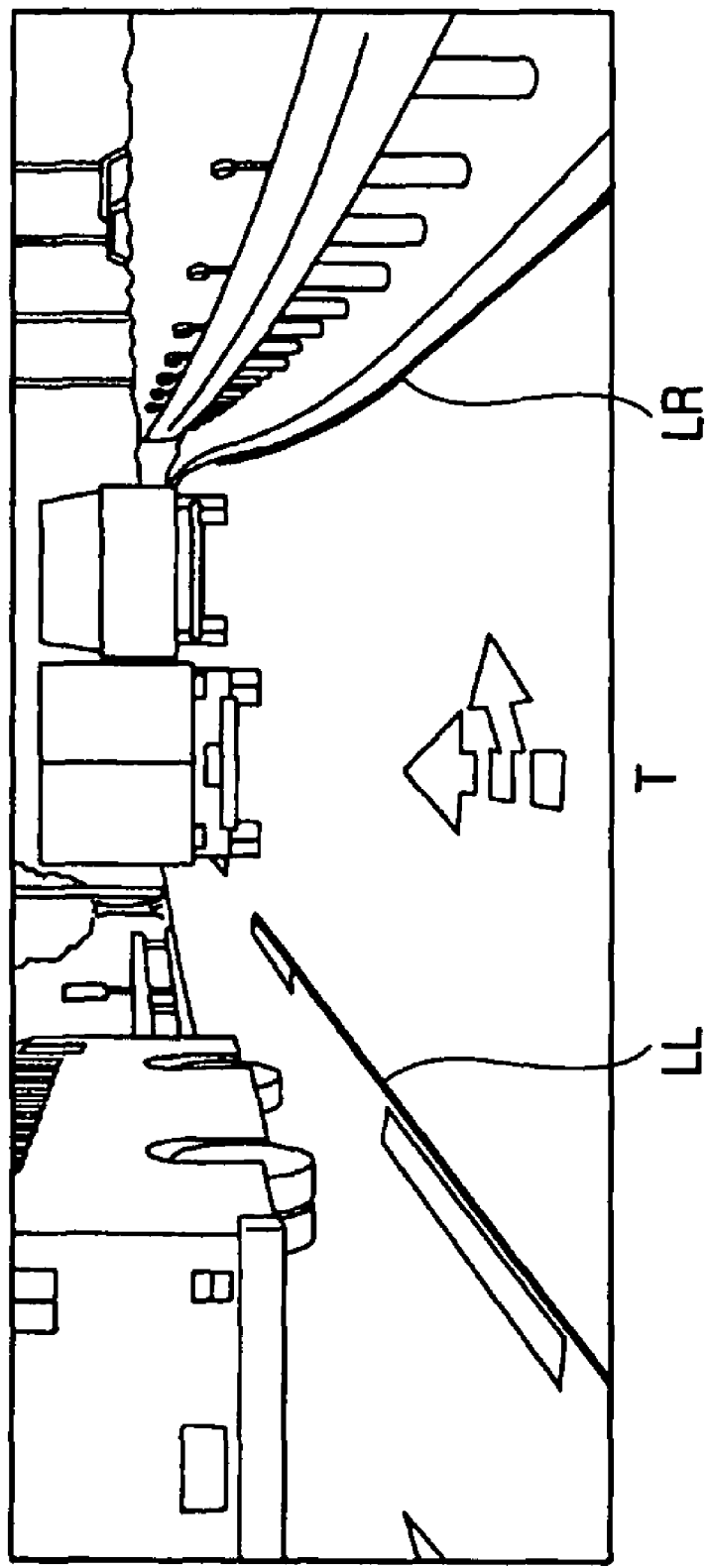
FIG. 4 is a view showing right and left traffic lines detected on the reference image.

The traffic line detecting unit 26a sequentially detects pixels by offsetting a horizontal line for search on a one-pixel width basis upwardly from the lower side of the reference image T. In this way, as shown in FIG. 4, the traffic line detecting unit 26a detects the right traffic line position LR on the right side of the vehicle and the left traffic line position LL on the left side of the vehicle on the reference image T and converts the lines on the reference image T to determine their positions in a real space.

The traffic line detecting unit 26a groups the detected pixels based on the intervals between the pixels and the directivities so that it can be determined whether the line is indicated as a continuous line such as a no-overtaking line and a section line that separates a roadside zone and a vehicle road or indicated as a broken line such as a vehicle passing zone boundary that permits a lane change.

Note that the pixel search is carried out by setting a search area on the reference image T. More specifically, in the present detecting processing, a search area is set in a fixed range on the reference image T including a traffic line position detected by the previous detection processing based on the traffic line position. If pixels are sequentially detected by offsetting horizontal lines on a one-pixel width basis upwardly from the lower side of the reference image T in the present detection and a pixel that satisfies the condition is not detected on a certain horizontal line, the search area is expanded for further search on the next horizontal line.

The solid object detecting unit 26b serves as means for detecting a solid object on a road surface. The solid object detecting unit 26b may be any means capable of detecting a solid object on a road surface with high precision, and the method of detection is not limited to any particular method. The solid object detecting unit 26a according to the embodiment is based on the outside vehicle monitoring device disclosed by JP-A-10-283477, details of which are given in the disclosure, while the arrangement will briefly be described.

The solid object detecting unit 26b divides a distance image read out from the distance data memory 25b into strip-shaped segments having a prescribed pixel width and extending in the vertical direction. A histogram related to the distance L for each of the pixels belonging to each of the strip-shaped segments is produced, and the distance to a section whose degree is maximum is determined as the distance of the strip-shaped segment. This process is carried out for all the segments.

Figure 5:
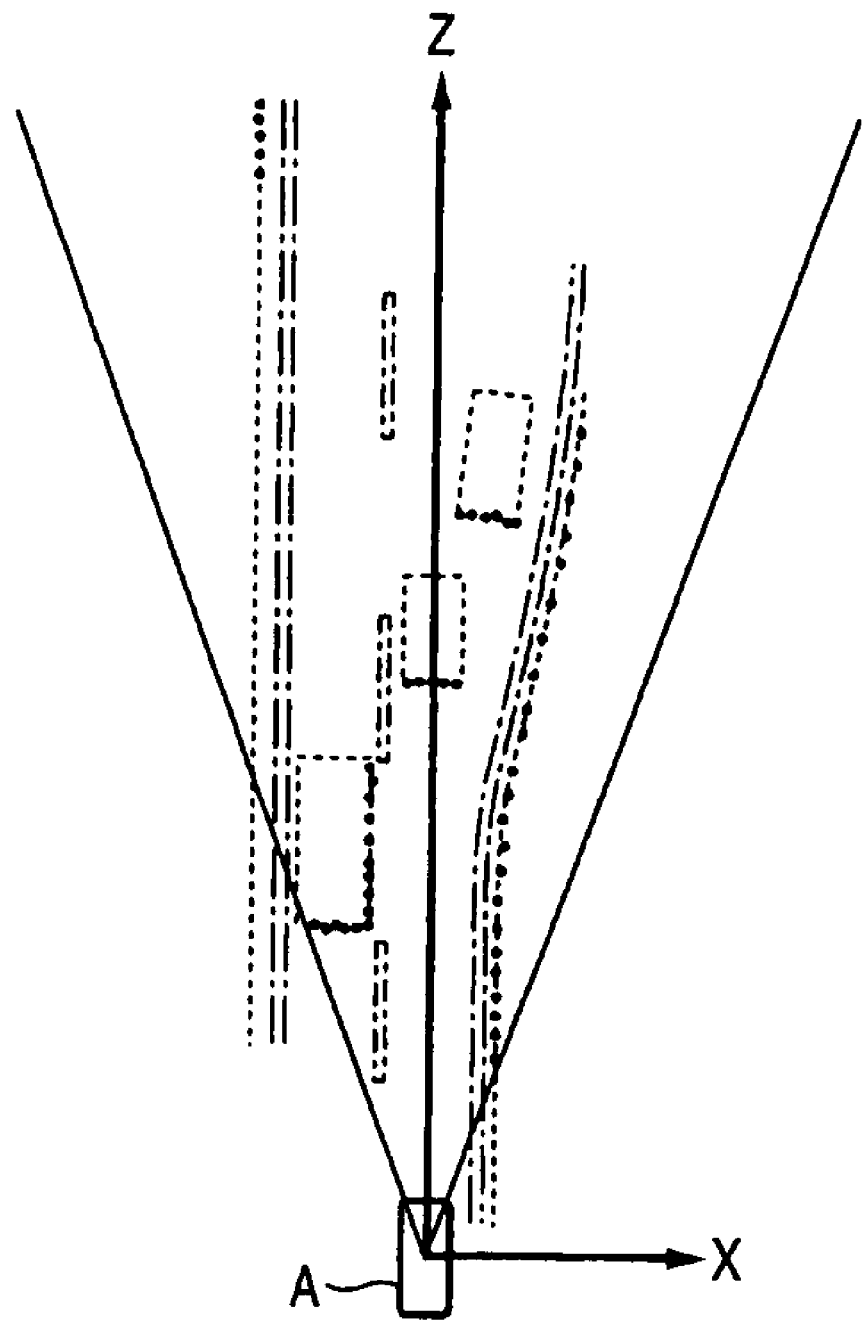
FIG. 5 is a plot of points on a real space representing distances of segments of a distance image.

For example, when the distances of segments obtained by dividing a distance image corresponding to the reference image T shown in FIG. 3 into strip-shaped segments are converted into points in a real space, the points are plotted at portions corresponding to the portions of the solid object facing the vehicle with some variations as shown in FIG. 5.

Figure 6:
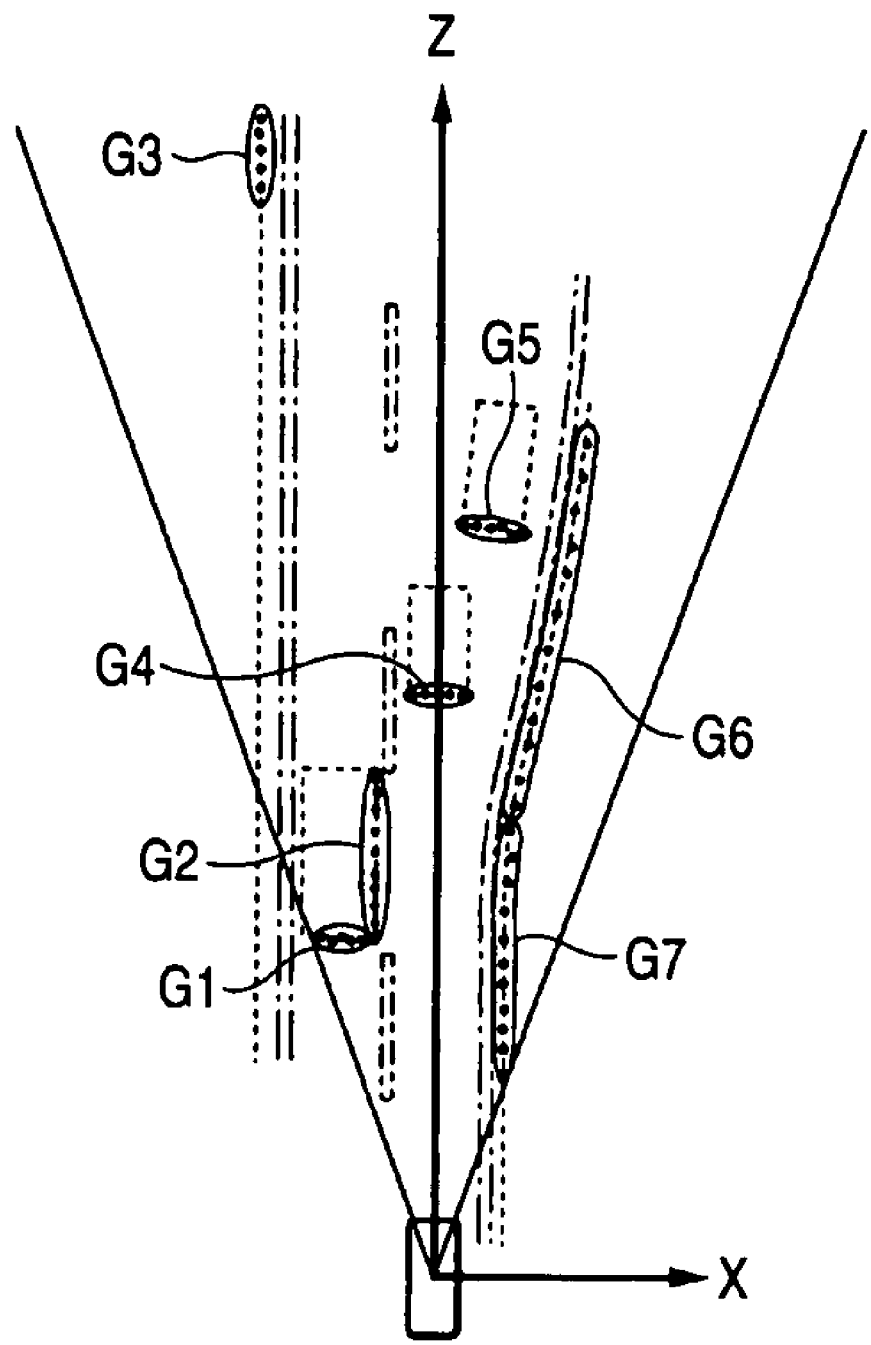
FIG. 6 is a plot showing the points in FIG. 5 as they are grouped.
Figure 7:
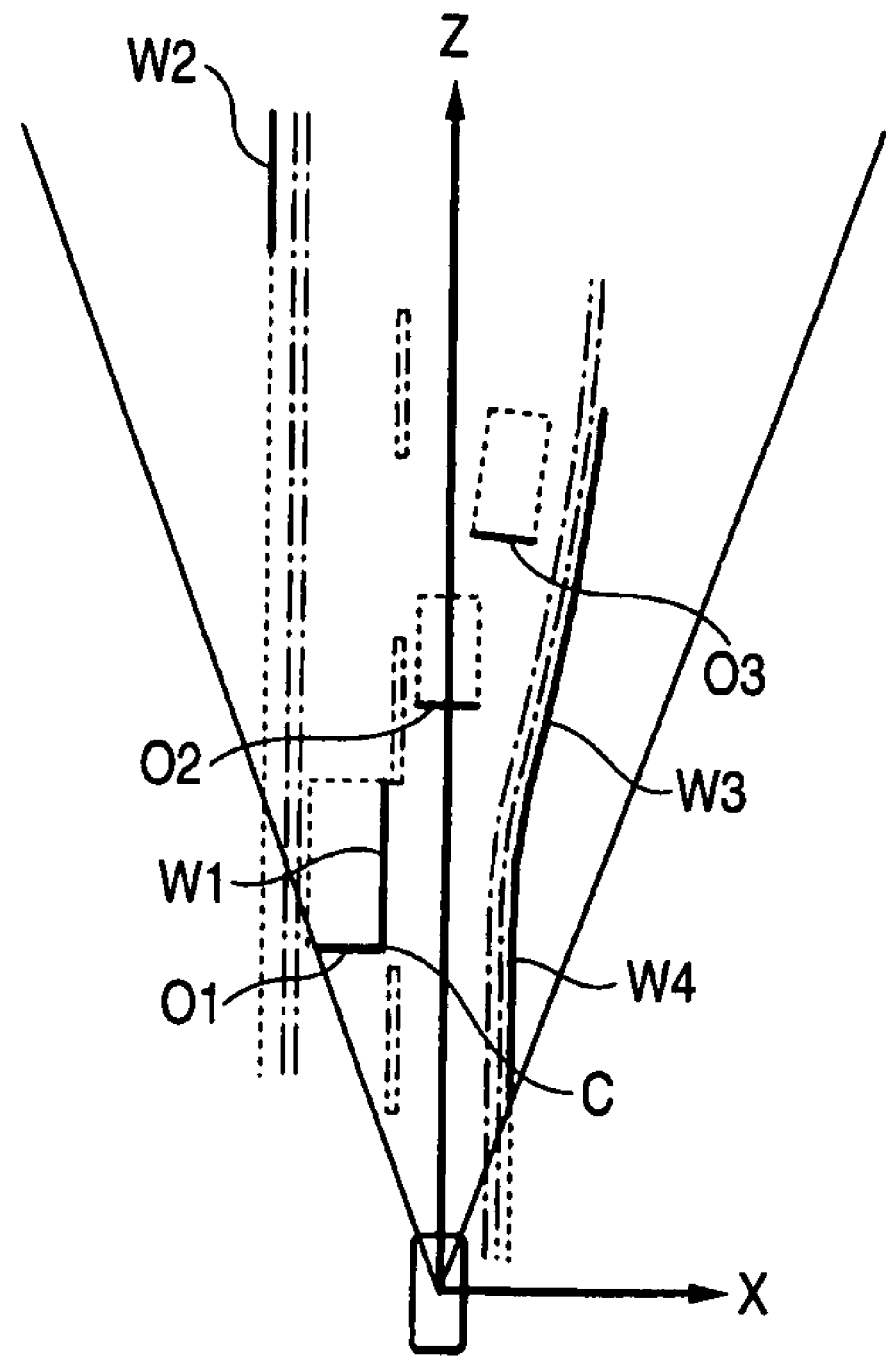
FIG. 7 is a plot showing objects and side walls detected by labeling the groups shown in FIG. 6.

As shown in FIG. 6, the solid object detecting unit 26b groups the points into groups G1 to G7 based on the distances of the points or the directivities as shown in FIG. 6, and as shown in FIG. 7, the groups having their points arranged substantially in the X-direction are labeled objects O1 to O3, and the groups having their points arranged substantially in the Z-direction are labeled side walls W1 to W4, so that the solid objects are detected as the "objects" and the "side walls."

Here, the X-direction is the vehicle width-wise direction orthogonal to the advancing direction of the vehicle, i.e., the right-left direction, and the Z-direction refers to the vehicle longitudinal direction, i.e., the front-back direction. The origin is placed at a point on the road immediately under the mid position between the main camera 21a and the sub camera 21b. Note that the Y-direction refers to the vehicle height direction, i.e., the vertical direction.

If an "object" and a "sidewall" belong to one solid object like the object O1 and the side wall W1 in FIG. 7, the solid object detecting unit 26b determines the combination of these "object" and "side wall" as a solid object S and calculates the corner of the solid object such as the boundary between the object O1 and the side wall W1 as a corner point Co.

Figure 8:
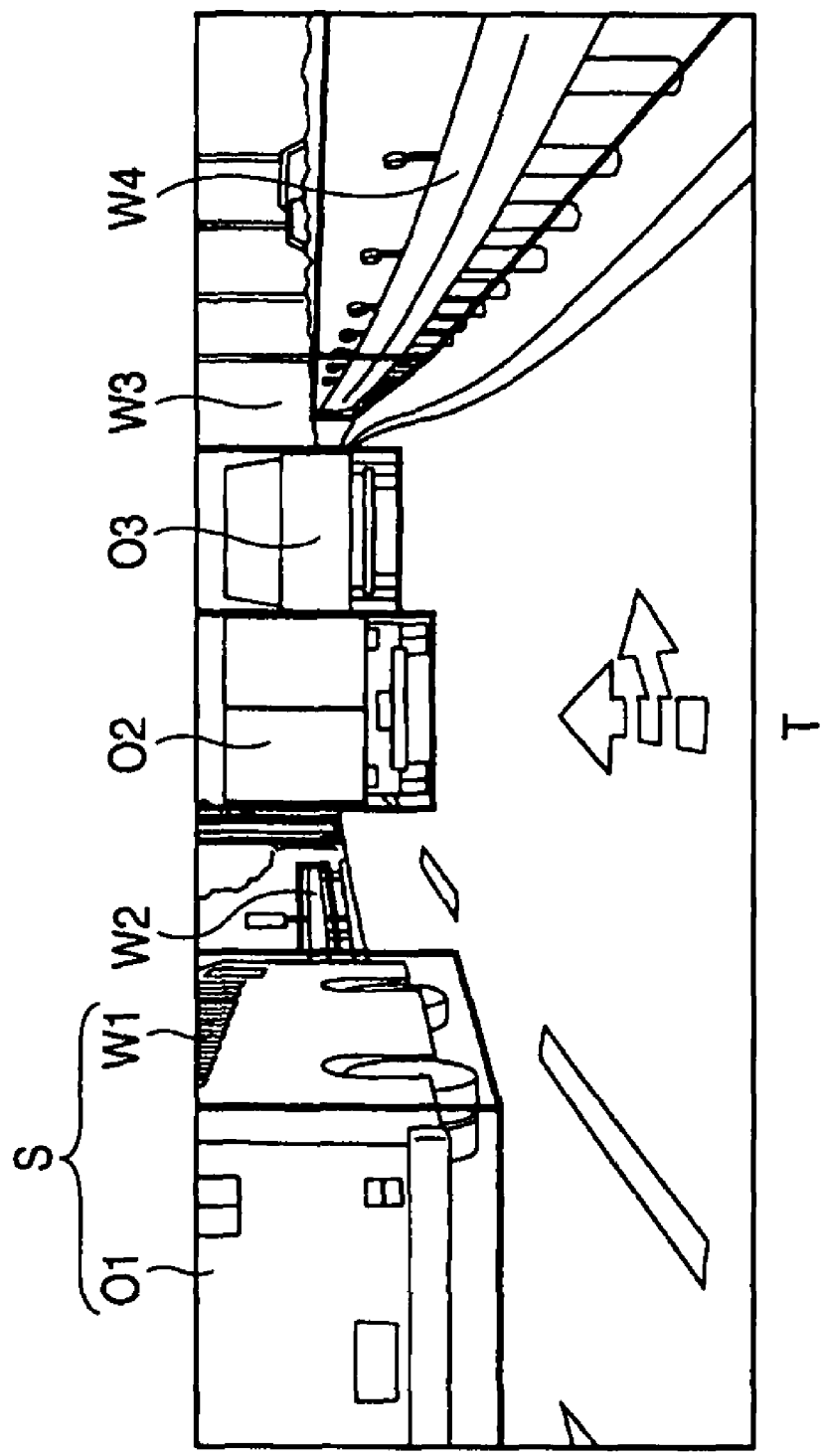
FIG. 8 is a view of a reference image having frame lines representing objects or side walls superposed thereon.

If the objects O, the side walls W, and the solid object S detected as described above are each surrounded by a frame line and superposed on the reference image T for display, an image as shown in FIG. 8 is displayed.

The detecting means 26 outputs information about the right traffic line position LR and the left traffic line position LL detected by the traffic line detecting unit 26a and the positional information about the solid object S, the objects O, and the side walls W detected by the solid object detecting unit 26b to the control means 3.

Figure 9:
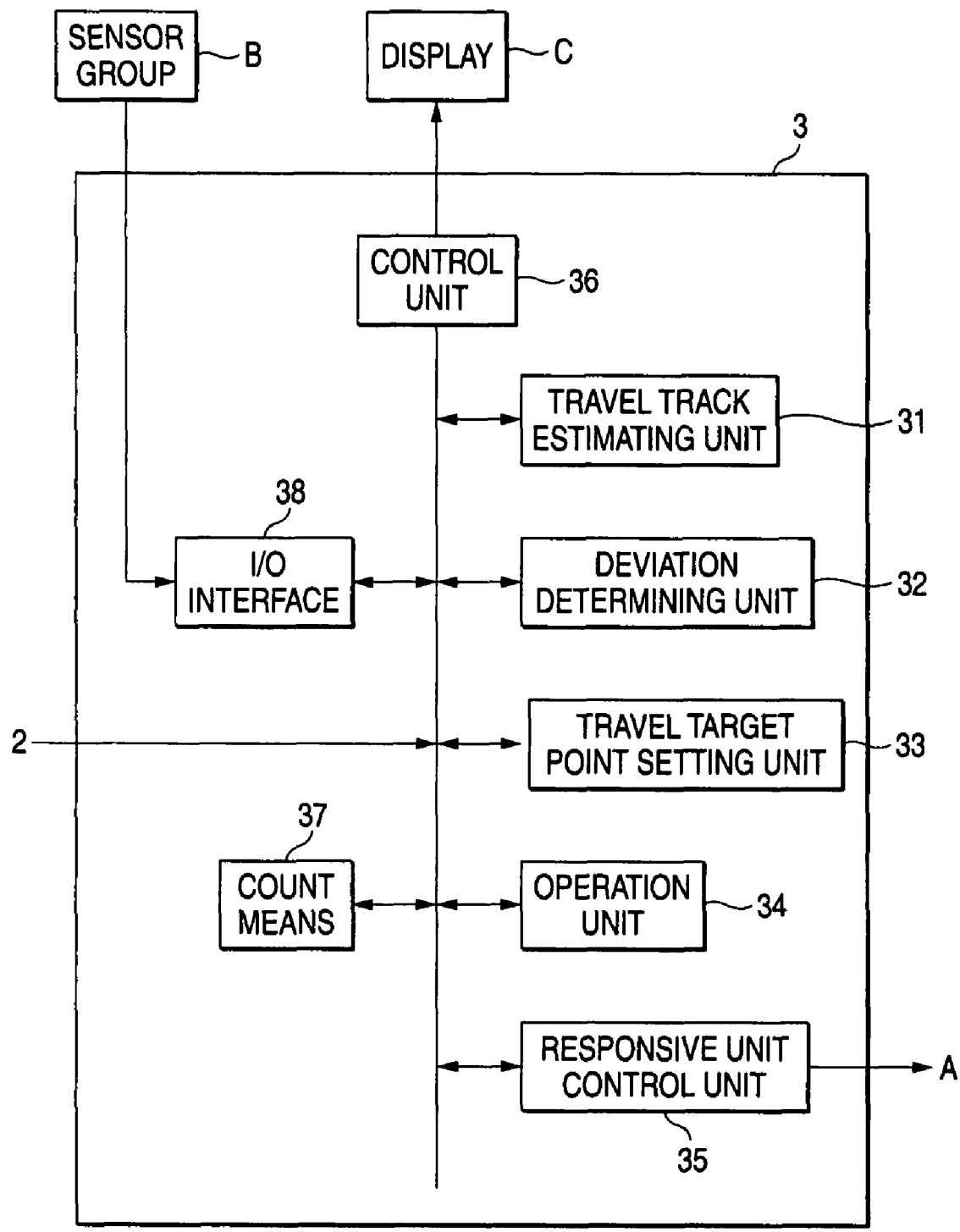
FIG. 9 is a block diagram of the configuration of control means according to the embodiment.

As shown in FIG. 9, the control means 3 includes a travel track estimating unit 31, a deviation determining unit 32, a travel target point setting unit 33, an operation unit 34, a responsive unit control unit 35, a control unit 36, and count means 37.

The control means 3 is connected with a sensor group B including a vehicle speed sensor, a steering wheel angle sensor, a steering wheel torque sensor, and a turn signal sensor through an I/O interface 38, and signals such as a vehicle speed V, the steering wheel angle δ of the steering wheel, a steering wheel torque TH applied to the steering wheel, and a turn signal TS are input to the control means from the sensor group B.

According to the embodiment, the sensor group B includes a yaw rate estimating device formed based on a device for generating a vehicle movement model disclosed by JP-A-2004-249812 (e.g., see also, U.S. Pat. No. 7,308,432). The yaw rate estimating device estimates a yaw rate [gamma] based on the vehicle speed V and the steering wheel angle [delta] and transmits the estimated yaw rate [gamma] to the control mean 3. Note that the yaw rate sensor may be connected to the control means 3 so that a measured value of the yaw rate [gamma] may be input to the control means 3.

The travel track estimating unit 31 virtually sets a real space and calculates a travel track Lest from the turning curvature of the vehicle based on the present speed V and the yaw rate γ of the vehicle or on the vehicle speed V and the steering wheel angle δ input from the sensor group B.

The deviation determining unit 32 determines whether it is possible for the vehicle to deviate from a traffic line based on the travel track Lest, the width of the vehicle, and the right traffic line position LR and the left traffic line position LL detected by the traffic line detecting means 2.

Figure 10:
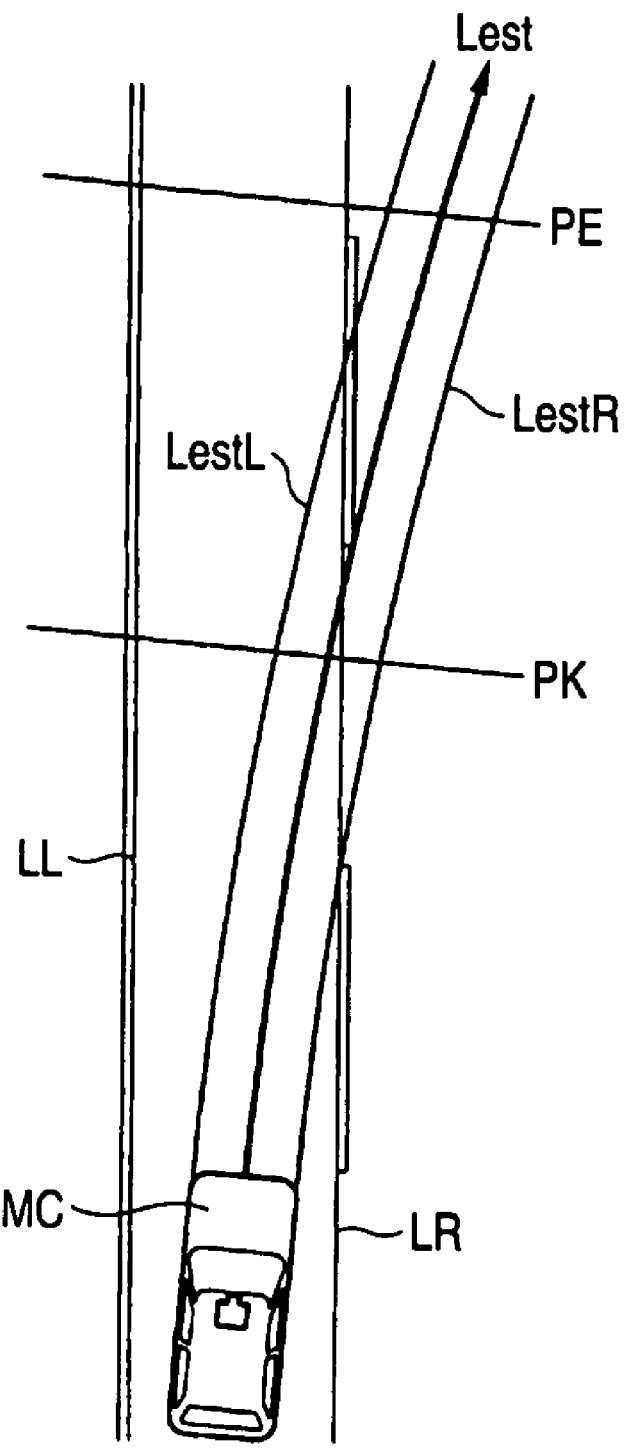
FIG. 10 is a view for use in illustrating a travel track, the positions of right and left traffic lines, and first and second determination lines specified on a real space.

More specifically, as shown in FIG. 10, the deviation determining means 32 arranges the right traffic line position LR and the left traffic line position LL on a virtual real space based on the information about the right traffic line position LR and the left traffic line position LL transmitted from the traffic line detecting means 2 and applies the travel track Lest of the vehicle MC calculated by the travel track estimating unit 31. The tracks LestR and LestL on the right and left ends of the vehicle with respect to the travel track Lest as the center are specified in consideration of the width of the vehicle.

A first determining line PK is set parallel to the width direction of the vehicle in other words in the X-direction at a first distance ahead of the vehicle such as 10 m, and a second determining line PE is set parallel to the width direction of the vehicle at a second distance such as 18 m ahead of the vehicle.

In this state, at the first determining line PK, the deviation determining unit 32 determines that it is possible for the vehicle to deviate from a traffic line if the track LestR of the right end of the vehicle in view of the vehicle MC is on the outer side of the right traffic line position LR or if the track LestL of the left end of the vehicle is on the outer side of the left traffic line position LL. Then, at the second determining line PE, the deviation determining unit 32 determines that it is possible for the vehicle to deviate from a traffic line if the track LestR of the right end of the vehicle is on the outer side of the right traffic line position LR or the track LestL of the left end is on the outer side of the left traffic line position LL.

The deviation determining unit 32 determines that the vehicle MC is likely to eventually deviate from the traffic line if these two determination results both indicate the possibility of the deviation from the line.

The travel track estimating unit 31 and the deviation determining unit 32 are formed based on the vehicle driving support device disclosed by JP-A-2003-16593.

The travel target point setting unit 33 sets a travel target point to which the vehicle should advance if the deviation determining unit 32 determines that there is a possibility of the vehicle's deviation from a traffic line. Note that the travel target point refers to a point ahead of the vehicle and a target distance apart from the vehicle, toward which the vehicle should advance. The travel target point setting unit 33 does not set a travel target point unless the deviation determining unit 32 determines that there is a possibility of the vehicle's deviation from a traffic line.

Figure 11:
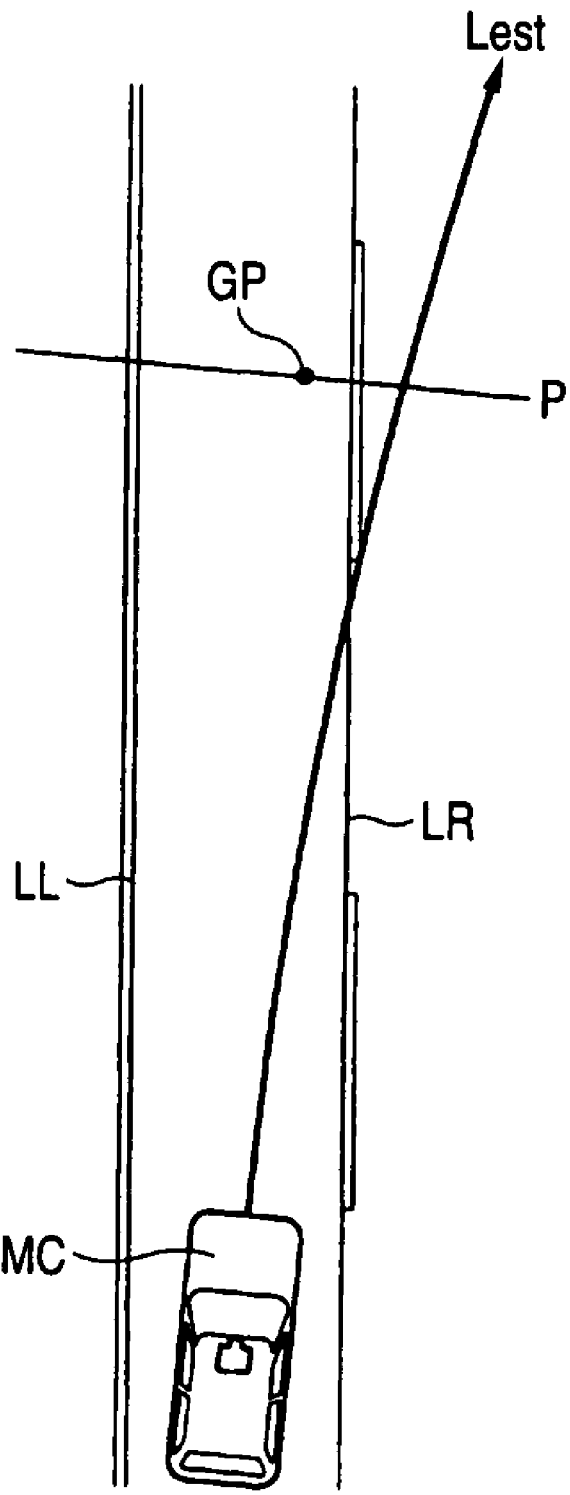
FIG. 11 is a view showing a travel target point set on a traffic lane at the start of control operation by deviation preventing control.

According to the embodiment, as shown in FIG. 11, the travel target point setting unit 33 sets a point ahead by a distance produced by adding a prescribed distance to the travel distance by the vehicle MC if the vehicle travels at the present speed V for a prescribed time period as a position P located a target distance ahead.

The travel target point setting unit 33 sets a travel target point GP that is set for the first time when the deviation determining unit 32 determines that there is a possibility of the vehicle's deviation from a traffic line at a position apart from the position of the line from which the vehicle is to deviate by a distance equal to a half of the width of the vehicle. In FIG. 11, if the vehicle MC is placed to advance toward the travel target point GP, the right end of the vehicle coincides with the right traffic line position LR.

Figure 12:
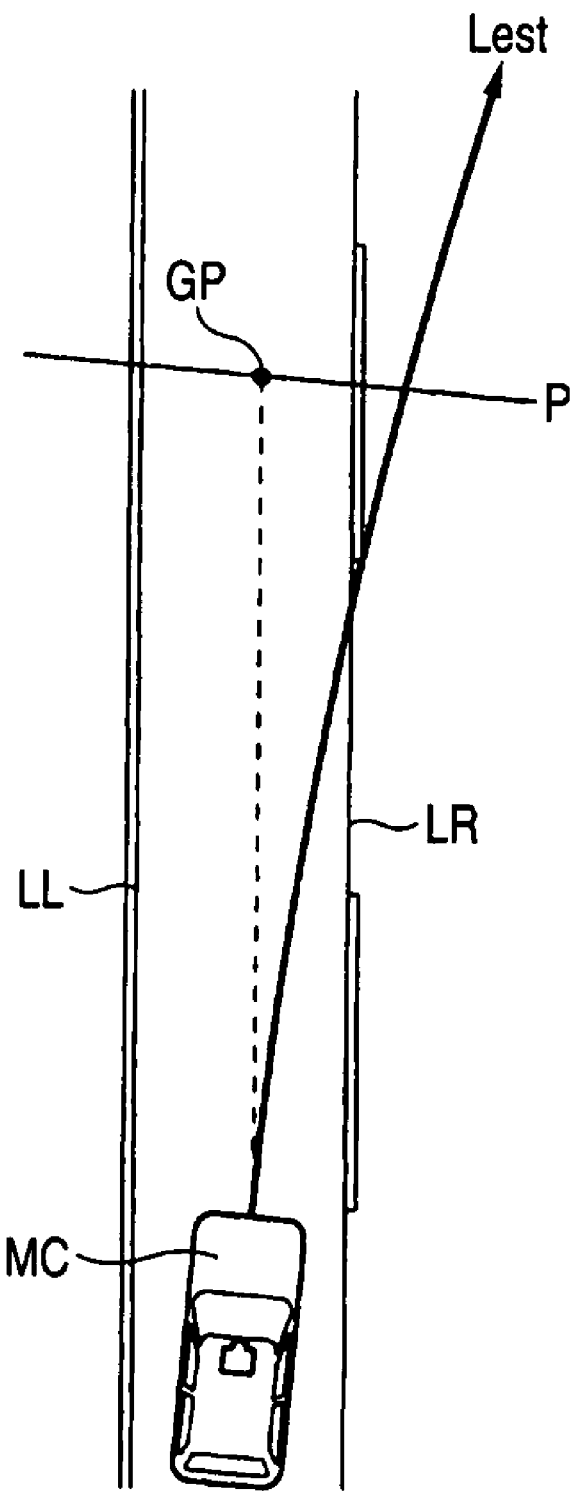
FIG. 12 is a view showing a travel target point set immediately in front of the vehicle at the start of control operation by deviation preventing control.

Note that the travel target GP set for the first time when the deviation determining unit 32 determines a possibility of the vehicle's deviation from a traffic line may be set to a position on a position P ahead of the vehicle by the target distance and apart from the traffic line from which the vehicle is to deviate by the present distance between the traffic line and the vehicle. More specifically, as shown in FIG. 12, the travel target point GP may be set at a position immediately in front of the center of the vehicle along the direction of the traffic line.

In the following sampling cycles, the travel target point setting unit 33 specifies the right traffic line position LR and the left traffic line position LL in a real space for each sampling cycle based on information about the right traffic line position LR and the left traffic line position LL transmitted from the traffic line detecting means 2 for each sampling cycle and sets the position P ahead of the vehicle by the target distance according to the manner as described above.

In the present sampling cycle, the travel target point GP is set at a point moved from the travel target point GP set in the previous sampling cycle by a prescribed distance to the center of the traffic lane of the vehicle. In this way, according to the embodiment, the moving distance for each sampling cycle of the travel target point GP is set to be a fixed value.

More specifically, if the deviation determining unit 32 determines that there is a possibility of the vehicle's deviation from a traffic line and the travel target point GP is set for the first time in the first cycle, the position of the travel target point GP of the n-th cycle is set in a position apart from the first set target point GP by (the moving distance per sampling cycle)×(n−1).

Note that the moving distance per sampling cycle can be changed for each sampling cycle. The moving distance per sampling cycle for the travel target point GP may be set so that the position of the travel target point GP is in the center of the traffic lane calculated based on the line positions LR and LL at the end of the control operation by the deviation preventing control.

Figure 13:
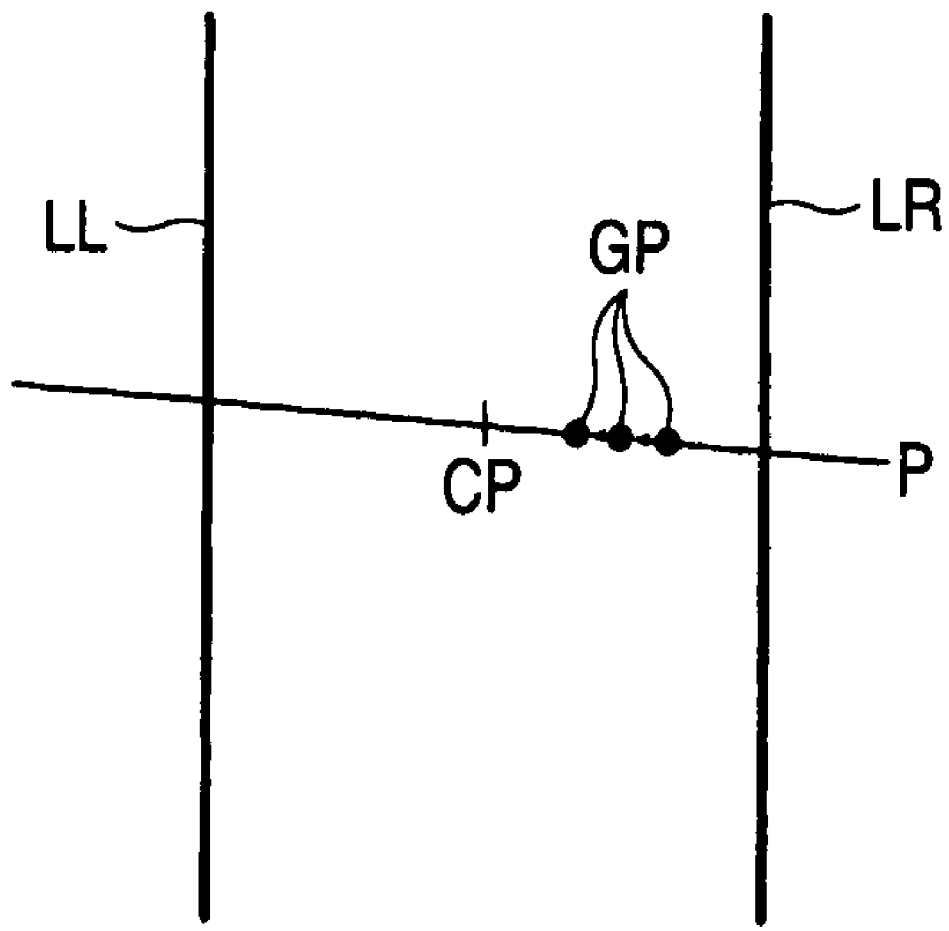
FIG. 13 shows a travel target point that moves toward the center of the traffic lane for each sampling cycle.

The travel target point setting unit 33 repeats the above-described operation for each sampling cycle, and therefore if the travel target point GP is set as shown in FIG. 11, the travel target point GP departs from the right traffic line position LR for each sampling cycle and gradually moves toward the center CP of the traffic lane as shown in FIG. 13.

Figure 14:
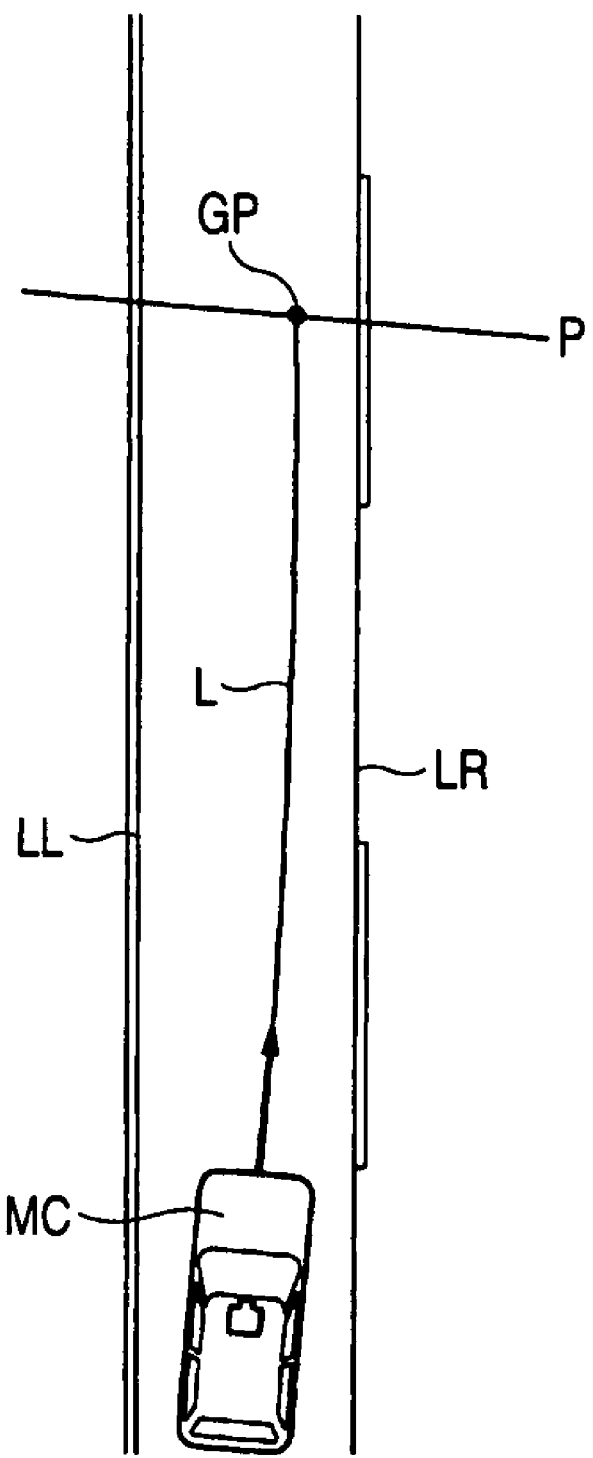
FIG. 14 is a view a determined driving line.

Once the travel target point setting unit 33 sets the travel target point GP, the operation unit 34 determines the driving line L of the vehicle assuming that the path of vehicle MC toward the travel target point GP is an arc as shown in FIG. 14. The radius of curvature of the driving line L is calculated as a target radius r based on the advancing direction of the vehicle MC denoted by the arrow and the position of the travel target point GP on the position P. Note that the arc includes a shape whose target radius r is infinite in other words a straight line.

The operation unit 34 calculates a target steering wheel angle $\delta est$ used to achieve the target radius r based on the calculated target radius r of the driving line L, the vehicle speed V, and vehicle characteristic parameters.

The responsive unit control unit 35 calculates a vehicle body slip angle $\beta$ based on an actual measurement value $\delta re$ of the steering wheel angle measured by the steering wheel angle sensor for example based on a two-wheel model, in other words, based on the real steering wheel angle $\delta re$, the vehicle speed V, and the vehicle characteristic parameters.

The responsive unit control unit 35 then calculates a self aligning torque Tsa based on a yaw rate $\gamma$ estimated by the yaw rate estimating device or measured by the yaw rate sensor, the vehicle slip angle $\beta$, the real steering wheel angle $\delta re$, the vehicle speed V, and the vehicle characteristic parameters. The calculated self aligning torque Tsa is multiplied by a gain value to produce a first electric power steering instruction torque current It1.

The responsive unit control unit 35 calculates a second electric power steering instruction torque current It2 by PD control so that the real steering wheel angle $\delta re$ measured by the steering wheel angle sensor equals the target steering wheel angle $\delta est$ calculated by the operation unit 34. The second electric power steering instruction torque current It2 is added to the first electric power steering instruction torque current It1 to produce a control instruction torque current It.

The responsive unit control unit 35 transmits the value of the control instruction torque current It calculated so that the vehicle drives following the driving line L to the responsive unit A as the control system having a steering servo function as a signal. The control system having the steering servo function generates a control instruction torque current based on the value of the transmitted control instruction torque current It so that automatic electric power steering is carried out.

Note that the calculation of the target steering wheel angle $\delta est$ by the operation unit 34 and the control instruction torque It by the responsive unit control unit 35 is carried out for each sampling cycle.

The control unit 36 controls the operation timings of the elements of the control means 3 and the flow of information between the elements. The control unit 36 is connected with a display C including a monitor screen and a speaker, and the control unit 36 transmits a signal to the display C during the control operation by the deviation preventing control to indicate that the deviation preventing control is active and let the driver know about the state by an audio sound.

When the deviation determining unit 32 determines that there is a possibility of the vehicle's deviation from a traffic line, the control unit 36 sets a count of the number of sampling cycles corresponding to set control operation time at the counter serving as the count means 37. The control operation time is set as required. For example, for the control operation time as long as six seconds, if the time required for one sampling cycle is 100 milliseconds, the count to be set is 60, while if the time required for one sampling cycle is 10 milliseconds, the count to be set is 600.

The control unit 36 has the count of the counter 37 decremented by one when the responsive unit control unit 35 outputs the value of the control instruction torque current It to the responsive unit A. More specifically, the count means 37 as the counter decrements the count by one for each sampling cycle and counts the passage of the control operation time in the deviation preventing control.

Meanwhile, the control unit 36 starts counting after the count of the counter 37 is reduced to a prescribed value by reducing the control operation time set at the counter 37 by the travel target point setting unit 33 if the solid object detecting unit 26b of the detecting means 26 of the traffic line detecting means 2 detects an obstacle such as a solid object S, an object O, and a side wall W on the side of a line from which the vehicle is likely to deviate.

At the same time, the control unit 36 corrects the moving distance of the travel target GP per sampling cycle and transmits the corrected distance to the travel target point setting unit 33 so that the final target point to be reached by the travel target point GP at the end of the control operation is reached by the newly set count. This is because the vehicle must quickly be returned to its own driving traffic lane in order to prevent collision against the obstacle.

When an obstacle such as a solid object S is detected on the side of a traffic line from which the vehicle is likely to deviate after the start of the deviation preventing control, the control unit 36 calculates the time before the traffic lane deviation is prevented and reduces the count based on the result so that the moving distance of the travel target GP per sampling cycle increases, and the corrected value is sent to the travel target point setting unit 33.

Figure 15:
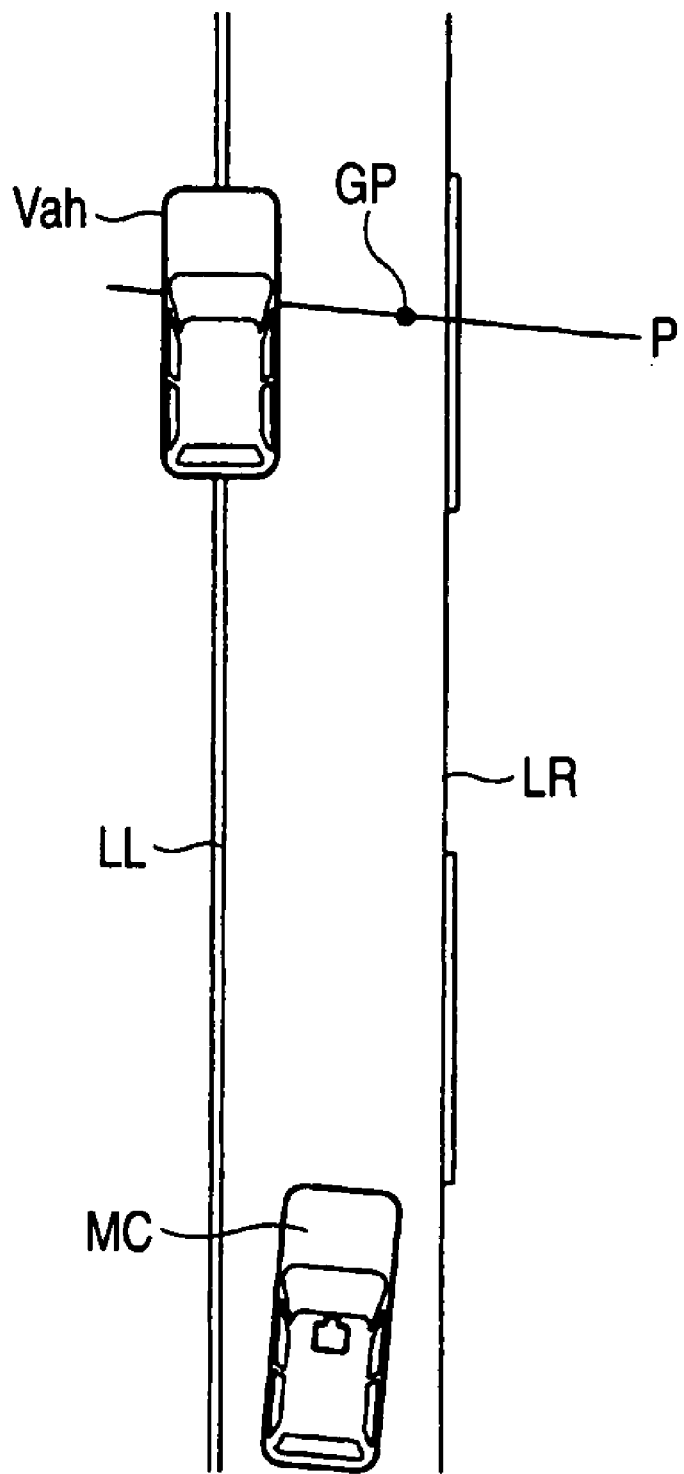

As shown in FIG. 15, when the solid object detecting unit 26b of the detecting means 26 of the traffic line detecting means 2 detects a solid object S as an obstacle such as a on-road parked vehicle Vah on the line opposite to the line from which the vehicle MC is likely to deviate, the control unit 36 stops the movement of the travel target point GP on the basis of a sampling cycle at the point where the positional relation is established in which the right end or left end facing the obstacle is for example one meter apart from the obstacle.

The travel target point GP set for the first time when the deviation determining unit 32 determines that there is a possibility of the vehicle's deviation from a traffic line is within a prescribed distance such as one meter apart from the obstacle, the control unit 36 ends the control operation by the deviation preventing control.

If a traffic line from which the vehicle is likely to deviate is detected as a line indicated as a continuous line by the traffic line detecting unit 26a of the detecting means 26 of the traffic line detecting means 2, the count is set to a value smaller than that of the counter 37 set when the traffic line is detected as a broken line, so that the control operation time by the deviation preventing control is shortened.

At the same time, the control unit 36 corrects the moving distance of the travel target point GP per sampling cycle to be larger and transmits the corrected value to the travel target point setting unit 33. This is because a traffic line indicated by a continuous line is more strictly prohibited from being crossed over than a traffic line indicated by a broken line.

Note that after the control means 3 starts the control operation by the deviation preventing control, the traffic line position is sometimes not detected by the traffic line detecting unit 26a of the detecting means 26 of the traffic line detecting means 2. In such a case, the control unit 36 continues the movement of the travel target point GP for each sampling cycle for a prescribed period based on a virtual traffic line position assuming that the previously detected traffic line still exists. This is based on the idea of failsafe.

Now, the case in which the control operation by the deviation control ends will be described. According to the embodiment, when the count of the counter 37 becomes zero, the setting of the travel target point GP at the travel target point setting unit 33 ends. The deviation preventing control by the control means 3 ends in response to the end of the setting of the travel target point GP at the travel target point setting unit 33.

The travel target point setting unit 33 ends the operation of setting the travel target point GP if the travel target point GP reaches a prescribed point before the count of the counter 37 becomes zero, in other words, before the control operation time set at the start of the control operation by the deviation preventing control elapses. When the travel target point GP is reached, the prescribed position at which the setting of the travel target point ends may be set for example in the center CP of the traffic lane. This is because when the vehicle returns to the center CP of the travel lane, the possibility of the vehicle deviation is sufficiently eliminated.

Furthermore, the travel target point setting unit 33 ends the ongoing control operation by the deviation preventing control if the end of the vehicle deviating from a traffic line exceeds the line by a prescribed distance or more to the outer side. This is because it is determined that the driver intends to make a lane change in this case.

The control unit 36 forcibly ends the control operation if turn signal operation is carried out by the driver and a turn signal TS is input thereto. This is because it is determined that the driver intends to make a lane change and the deviation preventing control is not necessary.

When a steering wheel torque TH exceeding a prescribed threshold is input from the steering wheel torque sensor in response to the steering of the steering wheel by the driver, when a steering wheel torque TH continues to be input for a period exceeding prescribed duration, or when the differential value of the steering wheel angle δ of the steering wheel input from the steering wheel angle sensor, in other words, the steering wheel speed exceeds a prescribed threshold, and the steering wheel angle δ greatly changes, the ongoing control operation by the deviation preventing control ends. This is because it is determined that the driver himself/herself is aware of the deviation from a traffic line, and takes a preventing action or intends to make a lane change in this case, and therefore the deviation preventing control is not necessary.

Figure 16:
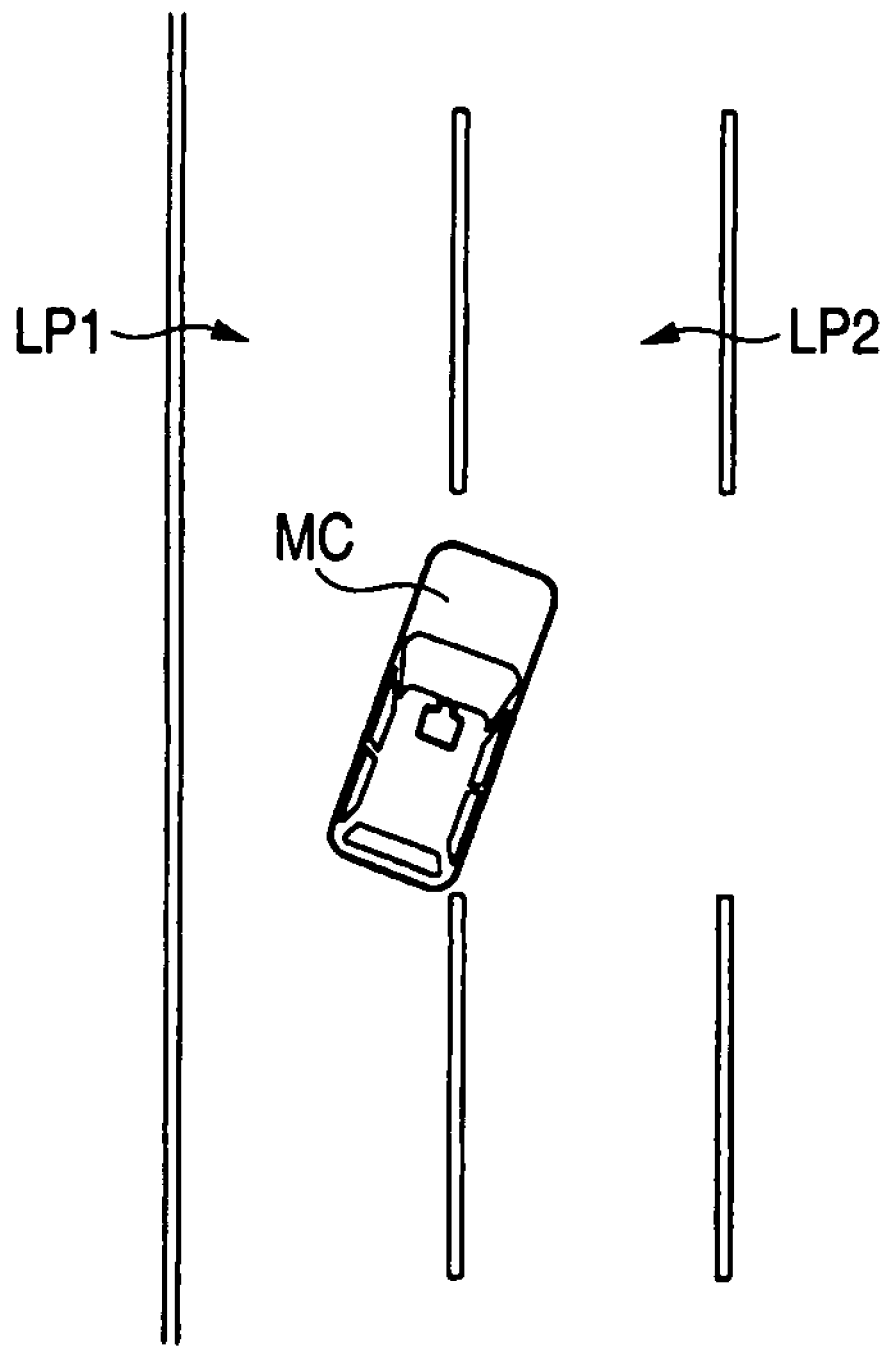
FIG. 16 is a view showing how the vehicle enters the adjacent traffic lane by a lane change.

If the driver intends to makes a lane change as described above, the control operation by the deviation preventing control ends in the traffic lane LP1 the vehicle is driving at present as shown in FIG. 16, and the deviation preventing control is carried out in the traffic lane LP2 adjacent to the side the vehicle is to enter, excess steering wheel torque is applied to the steering of the steering wheel, which can make the wheel steering unstable.

The control unit 36 therefore permits the control operation by the deviation preventing control to be started only when the vehicle MC moves toward a traffic line, and the control operation by the deviation preventing control is prohibited from being started if the vehicle MC moves away from the traffic line not in the state of lane deviation such as when the control operation by the deviation control preventing control ends based on the determination of a lane change. It goes without saying that if the vehicle moves away from a line as the advancing direction of the vehicle changes during the ongoing control operation by the deviation preventing control, the control operation by the deviation preventing control is continued.

Figure 17:
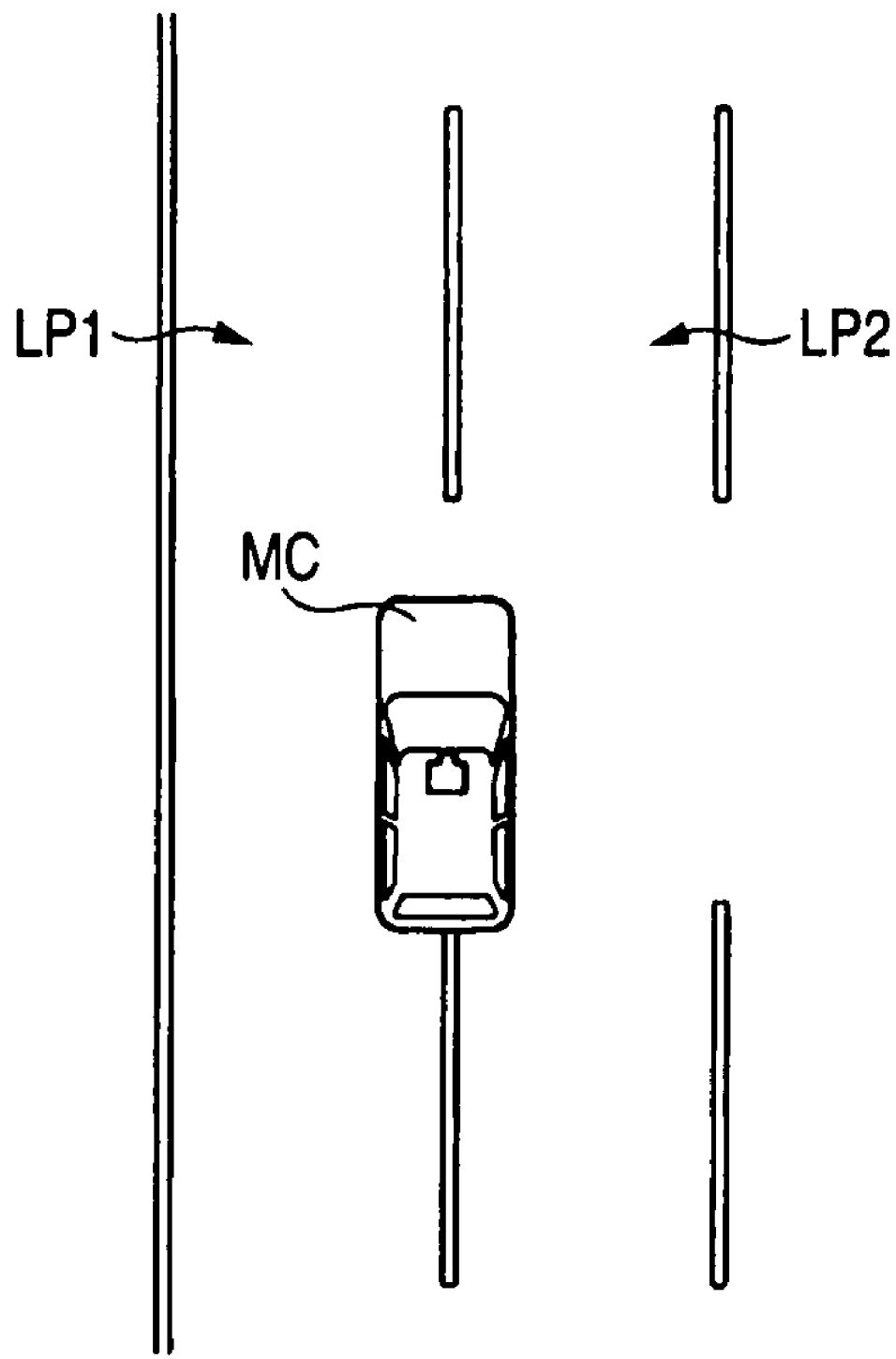
FIG. 17 is a view showing the vehicle traveling across a traffic line.

As shown in FIG. 17, after the end of the control operation by the deviation preventing control based on the determination of a lane change, if the vehicle MC continues to move across a traffic line, the control unit 36 does not start the control operation by the deviation preventing control.

The control unit 36 resets the count of the counter 37 to zero when the control operation by the deviation preventing control ends in any of the above cases.

Now, the function of the traffic lane deviation preventing system 1 according to the embodiment will be described.

The function of the traffic line detecting means 2 of the traffic lane deviation preventing system 1 is described in the foregoing, and the description will not be repeated.

The control means 3 of the traffic lane deviation preventing system 1 calculates the travel track Lest of the vehicle by the travel track estimating unit 31 for each sampling cycle. The deviation determining unit 32 determines whether it is possible for the vehicle to deviate from a traffic line according to the procedure shown in FIG. 10.

If it is determined by the deviation determining unit 32 that there is a possibility of the vehicle's deviation from the line, the vehicle target point setting unit 33 sets a travel target point GP at a position P located a target distance apart from the vehicle.

According to the embodiment, the travel target point GP moves toward the center of the traffic lane of the vehicle by a fixed moving distance for each sampling cycle until the count of the counter serving as the count means 37 becomes zero.

The vehicle drives on an arc having a target radius r calculated based on the travel target point GP and the advancing direction of the vehicle in a certain sampling cycle for the length of the sampling cycle, and in the next sampling cycle the vehicle drives for the length of the sampling cycle on a arc having a new radius r calculated based on the travel target point GP moved in the direction toward the center of the traffic lane by the fixed moving distance and the advancing direction of the vehicle in the sampling cycle.

Figure 18:
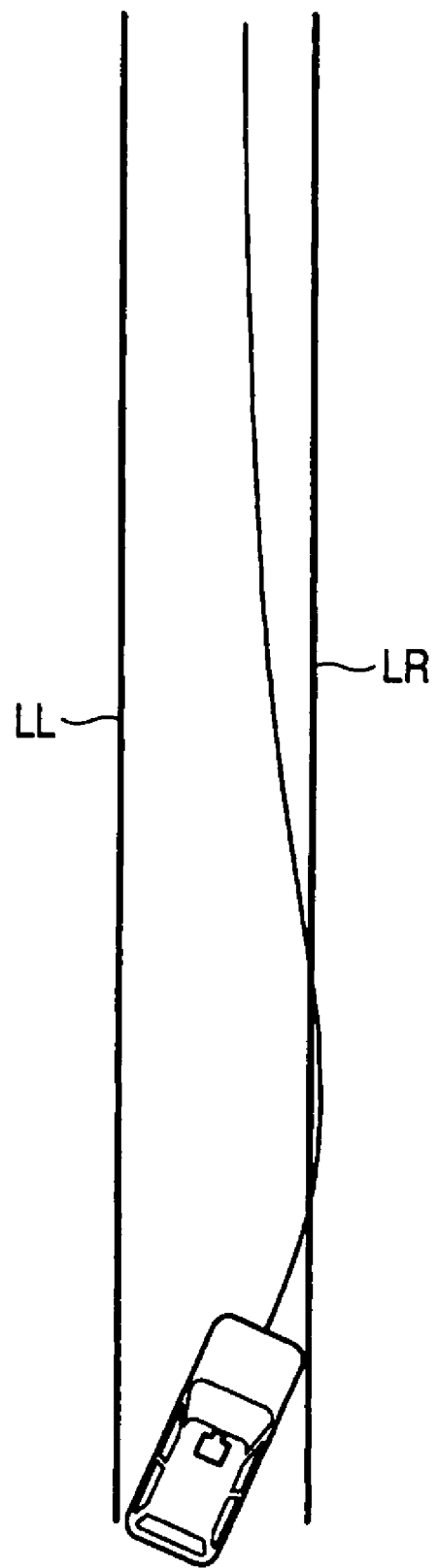
FIG. 18 shows a track of the vehicle achieved by the traffic deviation preventing system according to the embodiment.

In this way, the vehicle is pulled back to the lane in which the vehicle drives at present as it actually follows a smooth track as shown in FIG. 18.

As described above, with the traffic lane deviation preventing system 1 according to the embodiment, the travel target point GP set for the first time when it is determined that there is a possibility of the vehicle's deviation from a traffic line is not set in the center of the traffic lane the vehicle drives in like the conventional traffic lane deviation preventing system but is set nearer to the traffic line. Therefore, as can be understood from the comparison between FIG. 18 and FIG. 20, with the lane deviation preventing system 1 according to the embodiment, the steering wheel is gradually turned and the yaw rate and the steeling wheel torque of the vehicle gradually changes, so that the lane deviation can be prevented without giving the driver any awkward feeling as if the driver is forcibly pulled back in the vehicle position.

Figure 20:
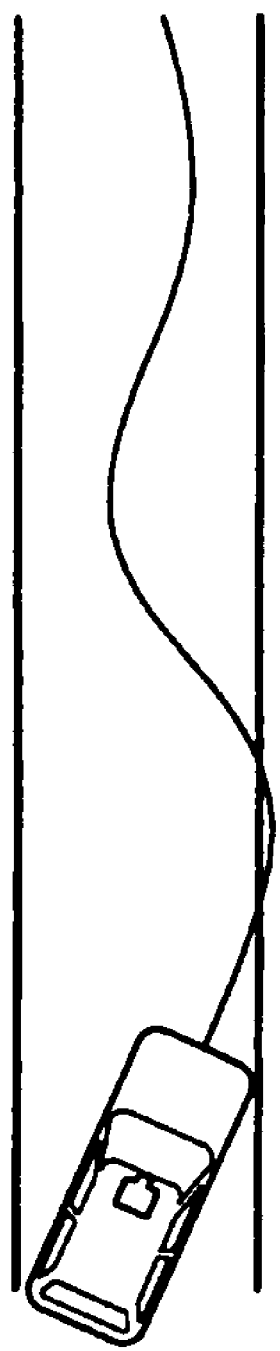
FIGS. 20 and 21 each show a track of the vehicle achieved by a conventional deviation preventing system.

Since the travel target point GP is moved toward the center of the traffic lane according to the elapse of the control operation time, the vehicle can smoothly be pulled back to the central side of the traffic lane without causing the vehicle to meander between the right and left with respect to the center of the traffic lane by overshoot as is the case with the conventional deviation preventing system shown in FIG. 20.

Figure 21:
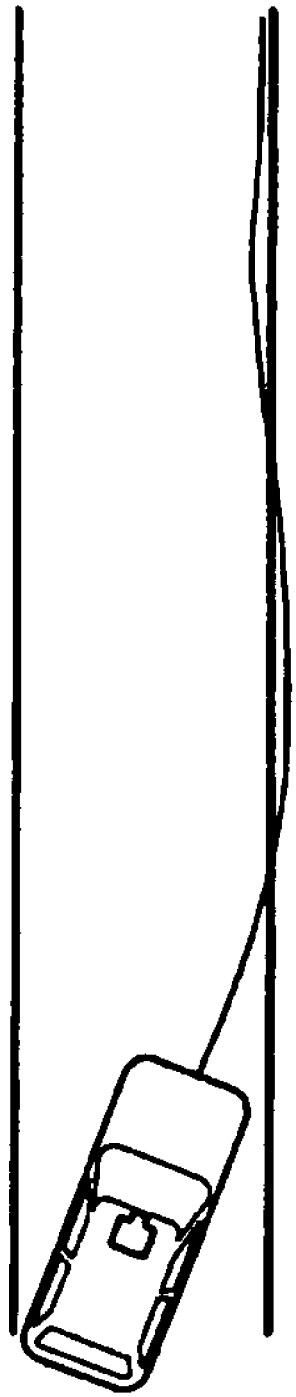

Furthermore, the travel target point GP is moved away from a traffic line from which the vehicle is likely to deviate, so that the vehicle does not stay near the line like the conventional line preventing system as shown in FIG. 21, and the vehicle can be pulled back to the central side of the traffic lane, so that the lane deviation can be surely prevented and the vehicle can be prevented from contacting a vehicle driving in the adjacent lane.

In the travel target point setting unit 33 of the control means 3 of the traffic lane deviation preventing system 1 according to the embodiment, a variation of the way of setting a travel target point GP set for the first time when a possibility of the vehicle's deviation from the traffic line is determined will be described.

Figure 19:
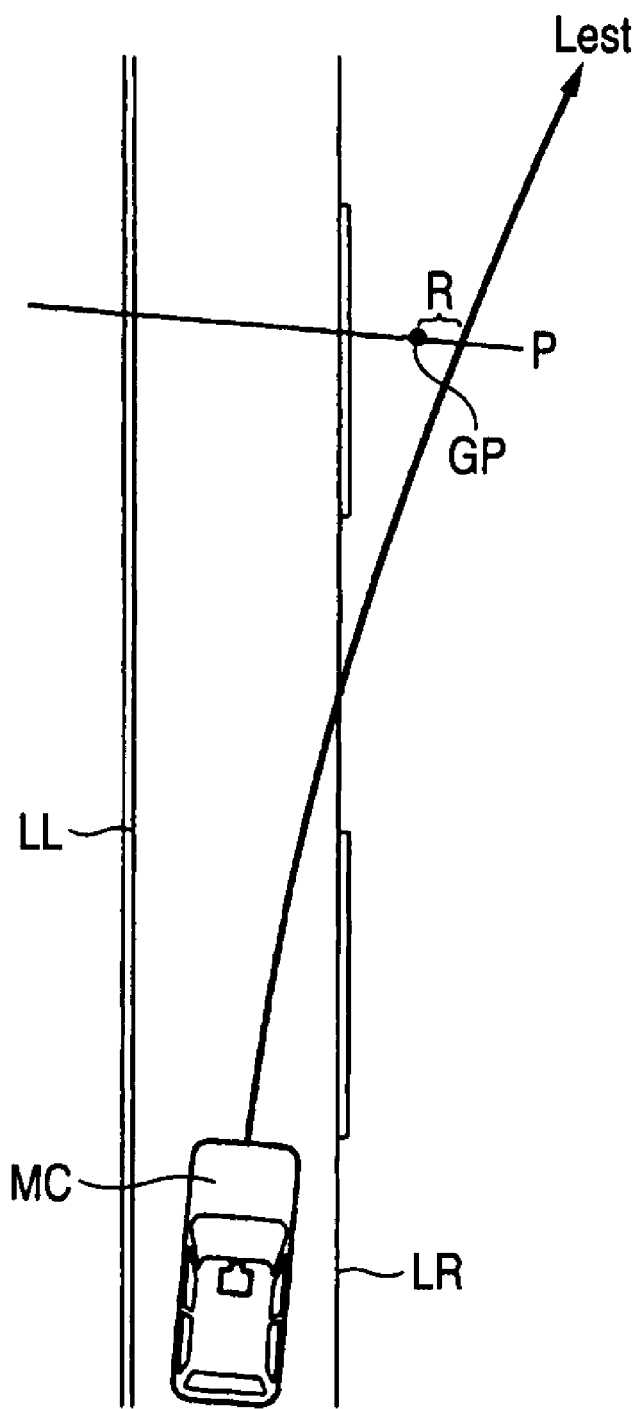
FIG. 19 is a view showing a travel target point set on the outer side of a traffic line from which the vehicle is likely to deviate.

The travel target point GP set by the travel target point setting unit 33 for the first time when a possibility of the vehicle's deviation from a traffic line is determined may be set on the outer side of the traffic line from which the vehicle MC is likely to deviate as shown in FIG. 19.

Once the control operation by the deviation preventing control is started, the yaw rate $\gamma$, and the steering wheel torque TH applied to the steering wheel and the steering wheel angle $\delta$ change and the driver may feel as if the vehicle has its attitude changed abruptly. Therefore, a threshold for the yaw rate $\gamma$ or the like that does not cause the driver to feel the awkwardness is previously obtained, and the travel target point GP set for the first time may be set in such a position that changes are kept equal to or smaller than the threshold.

When the vehicle is to deviate from a traffic line because of the driver's drowsy driving, inattentiveness in the advancing direction or the like, the driver should be aware of the start of control operation by the deviation preventing control, so that the driver is warned. In such a case, contrary to the above, a threshold for changes in the yaw rate $\gamma$ or the like about in the level which allows the driver to be aware of the start of the control operation by the deviation preventing control is obtained in advance, and the travel target point GP set for the first time may be set in such a position that allows a change larger than the threshold to be generated.

Note that the threshold varies depending on vehicle characteristics and therefore determined each for the kinds of vehicles as required. As shown in FIG. 19, an offset amount R from the travel track Lest in the position P corresponding to the threshold may be previously set.

The traffic lane deviation preventing system 1 according to the embodiment may include a vehicle travel supporting device as disclosed by JP-A-2005-41308 (e.g., see also, U.S. Pat. No. 7,302,327) or a wakefulness estimating device as disclosed by JP-A-2005-71185 (e.g., see also, U.S. Pat. No. 7,084,772) as wakefulness estimating means used for estimating the wakefulness of the driver.

In this way, if the wakefulness estimating means determines that the wakefulness of the driver is low, the control means 3 corrects the control operation time set at the counter as the count means 37 to be shortened and the moving distance of the travel target point GP per sampling cycle to be increased, and then a change such as a relatively large yaw rate $\gamma$ is generated at the start of the control operation by the deviation preventing control, so that the driver can be awakened.

Meanwhile, if the travel target point GP set for the first time is set on the outer side of a traffic line from which the vehicle is likely to deviate, the travel target point GP at the end of the control operation can be set for example in a position apart from the line by a distance equal to a half of the vehicle width on the inner side of the line. In this way, the end of the vehicle coincides with the position of the line from which the vehicle could otherwise deviate at the end of the control operation, so that at least contact or collision with a vehicle driving in the adjacent traffic lane can be prevented.

What is claimed is:

1. A traffic lane deviation preventing system for a vehicle, comprising:
   a traffic line detector for detecting the position of a traffic line on a road;
   a controller for determining a possibility of vehicle deviation from the traffic line, based on the position of the traffic line detected by said traffic line detector, said controller is configured to carry out deviation preventing control by setting a travel target point and transmitting a signal to a responsive unit so that the vehicle travels toward the travel target point when it is determined that vehicle deviation from the traffic line is possible; and a counter for counting the passage of a control operation time of said deviation preventing control, wherein said controller is further configured to set a current travel target point at a point moved from a previous travel target point set in a previous sampling cycle by a prescribed distance toward the center of a traffic lane in which the vehicle travels, with each sampling cycle, until said control operation time counted by said counter becomes a prescribed time.

2. The traffic lane deviation preventing system for a vehicle according to claim 1, wherein said controller is further configured such that, if the traffic line position is no longer detected by said traffic line detector after the start of control operation by said deviation preventing control, said controller continues to move said travel target point based on the previously detected position of the traffic line and continues the control operation by said deviation preventing control.

3. The traffic lane deviation preventing system for a vehicle according to claim 1, wherein said controller is further configured to set said travel target point for the first time, to a point a prescribed distance ahead of the vehicle and a distance equal to a half of the vehicle width apart from the traffic line from which the vehicle is likely to deviate.

4. The traffic lane deviation preventing system for a vehicle according to claim 1, wherein said controller is further configured to set said travel target point for the first time to a point a prescribed distance ahead of the vehicle and apart from the traffic line by the present distance between the vehicle and the traffic line from which the vehicle is likely to deviate.

5. The traffic lane deviation preventing system for a vehicle according to claim 1, wherein said controller is further configured to set said travel target point for the first time to a point a prescribed distance ahead of the vehicle where a change at most equal to a prescribed threshold is generated in at least one of the yaw rate, the steering wheel torque, and the steering wheel angle of the steering wheel of the vehicle.

6. The traffic lane deviation preventing system for a vehicle according to claim 1, wherein said controller is further configured to set said travel target point for the first time, to a point a prescribed distance ahead of the vehicle where a change larger than a prescribed threshold is generated in at least one of the yaw rate, the steering wheel torque, and the steering wheel angle of the steering wheel of the vehicle.

7. The traffic lane deviation preventing system for a vehicle according to claim 1, wherein said controller is further configured to move said travel target point in said direction toward the center of said traffic lane by a prescribed distance per unit time.

8. The traffic lane deviation preventing system for a vehicle according to claim 1, wherein said controller is further configured to move said travel target point so that the position of said travel target point at the end of the control operation by said deviation preventing control is in the center of a traffic lane calculated from the positions of traffic lines on the right and left of the vehicle detected by said traffic line detector.

9. The traffic lane deviation preventing system for a vehicle according to claim 1, wherein said controller is further configured to move said travel target point so that said travel target point at the end of the control operation by said deviation preventing control is apart by a distance equal to a half of the vehicle width from a traffic line from which the vehicle is likely to deviate.

10. The traffic lane deviation preventing system for a vehicle according to claim 1, wherein said controller is further configured such that, if said travel target point reaches a prescribed position before said control operation time counted by said count means reaches the prescribed time, said controller ends the control operation by said deviation preventing control.

11. The traffic lane deviation preventing system for a vehicle according to claim 10, wherein said prescribed position is in the center of a traffic lane calculated from the positions of traffic lines on the right and left of the vehicle detected by said traffic line detector.

12. The traffic lane deviation preventing system for a vehicle according to claim 1, wherein said controller is further configured to end the control operation by said deviation preventing control when an end of the vehicle deviating from a traffic line protrudes from the traffic line at least by a prescribed distance on the outer side of the traffic line.

13. The traffic lane deviation preventing system for a vehicle according to claim 1, wherein, said controller is further configured such that after said controller ends the deviation preventing control, said controller does not start deviation preventing control when the vehicle moves away from the traffic line or continues to move across the traffic line.

14. The traffic lane deviation preventing system for a vehicle according to claim 1, wherein said controller is further configured to end the control operation by said deviation preventing control when the steering of the steering wheel by the driver of the vehicle is detected.

15. The traffic lane deviation preventing system for a vehicle according to claim 14, wherein the system is further configured to detect the steering of the steering wheel by said driver by any of: a steering wheel torque sensor which is configured to detect when a steering wheel torque exceeding a prescribed threshold is input, a steering wheel torque sensor which is configured to detect when a steering wheel torque continues to be input for a period exceeding prescribed duration, and a steering wheel angle sensor which is configured to detect when a differential value of the steering wheel angle of the steering wheel exceeds a prescribed threshold.

16. The traffic lane deviation preventing system for a vehicle according to claim 1, further comprising a solid object detector for detecting a solid object in an image produced by image-sensing a path ahead of the running vehicle including a road, wherein, said controller is further configured such that, when a solid object is detected by said solid object detector on the side of a traffic line from which the vehicle is likely to deviate, said controller shortens the control operation time set at said counter and increases the moving distance of said travel target point per unit time.

17. The traffic lane deviation preventing system for a vehicle according to claim 1, further comprising a solid object detector for detecting a solid object in an image produced by image-sensing a path ahead of the running vehicle including a road, wherein, said controller is further configured such that, when a solid object is detected by said solid object detector on a traffic line on the opposite side to the traffic line from which the vehicle is likely to deviate, said controller stops the movement of said travel target point in a location a prescribed distance apart from said solid object or ends the control operation by said deviation preventing control.

18. The traffic lane deviation preventing system for a vehicle according to claim 1, wherein said controller is further configured to indicate at a display connected thereto, or to output an audio sound, for notifying that the deviation preventing control is active.

19. The traffic lane deviation preventing system for a vehicle according to claim 1, wherein said controller is further configured such that, if the traffic line from which the vehicle is likely to deviate is indicated as a continuous line, said controller sets a control operation time that is shorter than a control operation time that would be set for a traffic line indicated as a broken line.

20. The traffic lane deviation preventing system for a vehicle according to claim 1, further comprising a wakefulness estimator for estimating the wakefulness of the driver, wherein
said controller is further configured to shorten the control operation time set at said counter and increase the moving distance of said travel target point per unit time if it is determined that the wakefulness of the driver is low based on an estimation result by said wakefulness estimator.

21. A traffic lane deviation preventing system for a vehicle, comprising:
a traffic line detector for detecting the position of a traffic line on a road;
a controller for determining a possibility of vehicle deviation from the traffic line based on the position of the traffic line detected by said traffic line detector, said controller configured to carry out deviation preventing control by setting a travel target point and transmitting a signal to a responsive unit so that the vehicle travels toward the travel target point when it is determined that vehicle deviation from the traffic line is possible; and
a counter for counting sampling cycles based on a control operation time of said deviation preventing control, during which control operation time the vehicle travels toward the travel target point, wherein
said controller is further configured to control said travel target point to move from a previous travel target point in a direction toward the center of a traffic lane in which the vehicle travels, with each sampling cycle, until said control operation time becomes a prescribed time.

22. The traffic lane deviation preventing system for a vehicle according to claim 21, wherein said controller is further configured to control said travel target point to move a calculated moving distance for each sampling cycle based on a predetermined control operation time.

23. The traffic lane deviation preventing system for a vehicle according to claim 22, wherein said controller is further is configured to selectively correct the calculated moving distance of said travel target point for one or more sampling cycles after the start of the control operation time, and during the passing of the control operation time.

* * * * *